(12) United States Patent
Norton

(10) Patent No.: US 6,849,701 B2
(45) Date of Patent: Feb. 1, 2005

(54) DROPLET POLYMERIZATION METHOD FOR SYNTHESIS OF MOLECULARLY IMPRINTED POLYMERS

(75) Inventor: Tucker Norton, Avondale, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/142,502

(22) Filed: May 10, 2002

(65) Prior Publication Data

US 2002/0198349 A1 Dec. 26, 2002

Related U.S. Application Data

(63) Continuation-in-part of application No. 10/091,322, filed on Mar. 4, 2002, now abandoned.
(60) Provisional application No. 60/272,841, filed on Mar. 2, 2001.

(51) Int. Cl.$^7$ .................................................. C08F 2/00
(52) U.S. Cl. ....................... 526/201; 526/199; 526/200; 526/243; 526/215; 526/326.2; 526/326.3
(58) Field of Search ................................ 526/201, 199, 526/200, 215, 326.2, 326.3, 318.43, 243

(56) References Cited

U.S. PATENT DOCUMENTS

| | | | |
|---|---|---|---|
| 3,922,255 A | | 11/1975 | Koestler et al. |
| 5,288,763 A | | 2/1994 | Li |
| 5,786,428 A | * | 7/1998 | Arnold et al. ............ 525/333.3 |
| 5,872,198 A | | 2/1999 | Mosbach et al. |
| 5,959,050 A | | 9/1999 | Mosbach et al. |
| 6,177,513 B1 | * | 1/2001 | Takeuchi et al. ............ 525/54.1 |
| 6,217,901 B1 | * | 4/2001 | Perrott et al. ................ 424/450 |
| 6,310,110 B1 | * | 10/2001 | Markowitz et al. ............ 52/199 |
| 6,461,873 B1 | * | 10/2002 | Catania et al. ............... 436/518 |

FOREIGN PATENT DOCUMENTS

WO     WO 00/41723 A1     7/2000

OTHER PUBLICATIONS

G. Wulff, Agnew. Chem. Int. Ed. Engl., vol. 11:341, 1972, The use of Polymers with Enzyme–Analogous Structures for the Resolution of Racemates.
Karsten Haupt et al, Trends in Biotech., vol. 16:468, 1998, Plastic Antibodies: Developments and Applications.
Gunter Wulff, Chemtech, vol. 28:19, 1998, Fitting Molecules into Polymeric Receptors.
Oliver Bruggemann, Journal of Chromatography A., vol. 889:15–24, 2000, New Configurations and Applications of Molecularly Imprinted Polymers.
L. I. Andersson et al., Chromatographia, vol. 46:57–62, 1997, Concentration of Sameridine Made by Molecular Imprinting.
B. A. Rashid et al., Analytical Communications, vol. 34:303–305, 1997, Preliminary Evaluation of a Molecular Imprinted Polymer for Solid–Phase Extraction of Tamoxifen.
Borje Sellergren, Journal of Chromatography A, vol. 673:133–141, 1994, Imprinted Dispersion Polymers: A New Class of Easily Accessible Affinity Stationary Phases.
Jun Haginaka et al., Journal of Chromatography A., vol. 849:331–339, 1999, Uniform–Sized Molecularly Imprinted Polymer for (S)–Naproxen Selectively Modified with Hydrophilic External Layer.
Peter A. G. Cormack et al., Reactive and Function of Polymers, vol. 41:115–124, 1999, Molecular Imprinting: Recent Development and the Road Ahead.
Klaus Mosbach et al., Journal of Molecular Recognition, vol. 11:62–68, 1998, Some New Developments and Challenges in Non–Covalent Molecular Imprinting Technology.
Lars I. Andersson, Journal of Chromatography B, vol. 739:163–173, 2000, Molecular Imprinting for Drug Bioanalysis a Review on the Application of Imprinted Polymers to Solid–Phase Extraction and Binding Assay.
Olof Ramstrom et al., Current Opinion in Chemical Biology, vol. 3:759–764, 1999, Synthesis and Catalysis by Molecularly Imprinted Materials.
Encyclopedia of Polymer Science and Engineering, vol. 8:342–343, Identification to Lignin.

\* cited by examiner

Primary Examiner—Tatyana Zalukaeva

(57) ABSTRACT

A droplet polymerization process is provided to create efficacious molecularly imprinted polymers (MIPs). Such imprinted polymers have increased surface area for adsorptive or catalytic reactions. This method provides for monomer-template interactions in the absence of a suspending medium, thereby permitting formation of MIPs with increased template selectivity and substantial processing advantages. The process is particularly useful for separating isoflavones from soy whey.

29 Claims, No Drawings

DROPLET POLYMERIZATION METHOD FOR SYNTHESIS OF MOLECULARLY IMPRINTED POLYMERS

This application is a continuation-in-part of Ser. No. 10/091,322 filed Mar. 4, 2002 abandoned, which claims benefit of provisional No. 60/272,841 filed Mar. 2, 2001.

FIELD OF THE INVENTION

The present invention relates to an improved method of synthesizing molecularly imprinted polymers (MIPs). More specifically, the invention involves a droplet polymerization method for creating MIPs that minimizes disruptions to monomer-template interactions through a rapid polymerization process and is not significantly inhibited by the suspending medium.

BACKGROUND OF THE INVENTION

Molecularly imprinted polymers, or MIPs, have become an area of tremendous scientific interest in the field of separations. Since the first publication of imprinting in an organic polymer three decades ago [G. Wulff, Agnew. Chem. Int. Ed. Engl., 11: 341 (1972)], MIPs have become recognized as suitable for a vast number of industrial applications. Molecular imprinting creates selective adsorptive or catalytic sites within an organic or inorganic polymer. Typically, this procedure involves polymerizing functional and crosslinking monomers in the presence of a template molecule that interacts with the functional monomer(s) via noncovalent or reversible covalent bonds. The template molecule forms imprints in the polymer. Extracting the template from the polymer leaves behind voids in the MIP where selective rebinding of the template or a template analog can occur. The imprinted polymer is then used as a specific separation tool with high selectivity or recovery for analytes (having identical or similar structure to the template molecule) from a sample. Given the tremendous diversity of suitable template molecules, a correspondingly vast array of molecularly imprinted polymers can be created for any given separation or catalytic application.

For example, the synthesis and use of molecularly imprinted polymers for applications such as solid phase adsorbents, chiral stationary phases, sensors, and even as weak enzyme mimics has been reviewed by a variety of investigators (see, for instance, O. Bruggemann et al., J. Chromatography A, 889: 15 (2000)).

The benefits of MIP-based separations include the following: 1) MIPs can be created to have high affinity and selectivity for virtually any particular molecule desired; 2) MIPs have a unique stability that is superior to that of natural biomolecules (e.g., antibodies or proteins which can also selectively rebind); 3) MIPs, or "antibody mimics", can operate in extreme conditions not appropriate for use of antibodies (e.g., at elevated temperatures, in organic solvents, and at extreme pH); 4) MIPs have high binding capabilites (e.g., up to several $\mu$M concentrations can normally be extracted using 5–20 mg of sorbent); and 5) MIPs are relatively simple and inexpensive to prepare.

However, adsorbent or catalytic MIPs suffer from two major deficiencies that render them unsuitable for widespread industrial use. First, the mass transfer performance of MIPs is low, a cause of poor adsorbate access to the imprinted sites. Secondly, the low adsorption capacity for adsorbent MIPs and the low catalytic rates for catalytic MIPs, respectively, limit their utility. Poor monomer-template interactions are recognized as the underlying cause of these deficiencies that prevent successful molecular imprinting. Frequently, poor monomer-template interactions result from interference created by the suspension medium [see, for instance, P. Cormack and K. Mosbach, React. Funct. Polym. 41(1–3), 115–124 (1999); K. Mosbach and K. Haupt, J. Mol. Recognit. 11(1–6), 62–68 (1998); and G. Wulff, Chemtech, 28:19 (1998)].

Previously, MIPs have been prepared by three primary techniques: bulk polymerization, suspension polymerization, and surface polymerization. These three techniques are described below, in terms of their respective method of synthesis and primary disadvantages.

Imprinting via bulk polymerization typically occurs by mixing together template, monomers, and initiators directly in a solvent, and then permitting polymerization to occur. This process creates chunks of polymer which must then be crushed, ground, and sieved to obtain the desired particle size [L. Andersson et al., Chromatographia, 46:57–62 (1997); B. A. Rashid et al., Analytical Communications, 34:303–5 (1997)]. In this method monomer-template interactions are expected to occur successfully in the presence of the solvent, and no mechanism exists to control particle morphology. Instead, grinding generates irregularly sized particles that pack poorly into a column and can potentially fracture the poorly formed active sites, further reducing or eliminating their usability. Grinding also generates a large amount of undesirable fines, which can exceed 50% of the original polymer mass. For these reasons, bulk polymerization is inherently inefficient, particularly at larger scale [O. Bruggemann et al., J. Chromatography A, 889:15–24 (2000); U.S. Pat. No. 5,959,050].

Imprinting via suspension polymerization uses a two-phase agitated system. Typically, monomers, template, and initiator form a first phase, while the suspending medium (water or another highly polar liquid) acts as a second phase. Polymerizing conditions are applied (e.g., heat or ultraviolet radiation) and the monomers are polymerized while they are dispersed throughout the second phase by agitation. However, water can interfere with monomer-template interactions through strong hydrogen bonding with the template. Because a large excess of water is typically present, it can actually saturate the monomer phase, disrupting the desired monomer-template interactions. The large excess of water or other suspending media can also solubilize the template, removing it from the monomer phase. This condition lowers the theoretical efficiency of imprinting (a ratio of the mass of template adsorbed relative to the mass of template used during polymerization). As a result, MIPs made with this method typically do not perform satisfactorily [B. Sellergren, J. Chromatography A, 673: 133 (1994)].

Imprinting via supension polymerization is exemplified in WO 00/41723, WO 00/41723 discloses a surfactant-free means of making molecularly imprinted particles ranging in size from 0.01–10 microns. However, the monomer-template interactions take place within a large excess of suspending media. In addition, the polymer throughput of this system is quite low due to the limit of 0.01–20% volume of polymerizable compounds relative to suspending media. U.S. Pat. No. 5,872,198 and U.S. Pat. No. 5,959,050 also disclose imprinting via supension polymerization; in these patents, however, perfluorocarbons are used as the suspending media in order to avoid the use of water. The primary disadvantage of perfluorocarbons is that they generally require a fluorinated surfactant, thus requiring capital-intensive solvent recovery systems. Further, the high density of perfluorocarbons (e.g., perfluoro[cyclohexane] density= 1.78 grams/milliliter) requires significant power input to prevent bulk phase separation during suspension polymerization. Finally, such perfluorocarbons can be environmentally unfriendly and present handling and disposal problems.

The third method of molecular imprinting is referred to as imprinting via surface polymerization [J. Haginaka et al., *J. Chromatography A*, 849: 331–9 (1999)]. In this process, a small coating of monomer and template is permitted to polymerize onto a pre-existing polymer surface. Such a method is inherently undesirable for many industrial applications because only the polymer surface is imprinted (the remainder is wasted or leads to nonspecific binding). As a result, the method requires large quantities of polymer since much of the polymer does not contain the adsorption sites of interest. In addition, when water is used as the continuous or second phase, template leaching and poor monomer-template interactions may interfere with the imprinting process.

Currently, the literature reveals no mention of a suspension polymerization method that allows these critical monomer-template interactions to occur without disruption. Neither is a general process described where a monomer-template mixture is allowed to associate to establish imprinted sites in the absence of suspending media, followed by a rapid polymerization to achieve good particle morphology and size control. Similarly, there is no art disclosing the concept of the imprinting and the extracting of a template in the same vessel—a useful improvement to process operation at the industrial level.

In the broad field of polymer synthesis (not including MIPs), methods are known in which a monomer mixture is premixed and allowed to form individual particles, then introduced into an aqueous phase where polymerization fully occurs. U.S. Pat. No. 3,922,255 discloses jetting a monomer mixture into a column-shaped vessel containing an aqueous phase under convective flow, followed by the transfer of the monomer/aqueous reaction mixture to a separate column maintained at elevated temperature via an aqueous feed, so as to allow polymerization of the monomer droplets. However, this method is not for formation of MIPs and considers neither template molecules nor the need for template-monomer interactions for molecular imprinting.

Thus, a need exists for a facile and reproducible polymerization method that permits formation of MIPs possessing improved binding affinity (in the form of strong template-monomer interactions unimpeded by solvent), uniform particle size distribution, and good mass transfer performance. The method needs to be simple and cost effective. Additionally, the method must eliminate: 1) the need for grinding of the polymer; 2) requirements for use of exotic fluids; and 3) premature loss of template to the suspending liquid. Such a method would specifically solve the problem of how to achieve efficient separation of isoflavones from soy whey.

SUMMARY OF THE INVENTION

Applicant has provided a droplet polymerization process to form a molecularly imprinted polymer. The process has the steps of:
  a) releasing a monomer-template reaction mixture comprising
    (i) at least one monomer; and
    (ii) at least one template molecule
as droplets into a liquid suspending medium, wherein at least one of the monomer-template reaction mixture and the liquid suspending medium further comprises a polymerization initiator system, whereby polymerization of each droplet is at least substantially completed in the suspending medium; and b) recovering the molecularly imprinted polymer from the suspending medium. Preferably, the at least one template molecule has a solubility in the suspending medium of at least 0.5 weight percent at a temperature of the suspending medium during the process.

More particularly, the monomer-template reaction mixture additionally has (iii) at least one porogen molecule and/or (iv) at least one solvent. Before or during step a) the monomer-template reaction mixture partially polymerizes, the viscosity of the monomer-template reaction mixture increasing by at least 0.1 centipoise, but not to the gel point, relative to the initial or starting viscosity of the monomer-template reaction mixture.

Before or after step (b) of the process, a further step is extracting the at least one template molecule from the molecularly imprinted polymer. Additionally, where both template molecules and porogen molecules are present in the monomer-template reaction mixture, they may be extracted from the molecularly imprinted polymer particles by the suspending medium Another embodiment of the process also includes recovering and recycling the at least one extracted template molecule for reuse in a subsequent monomer-template reaction mixture.

The at least one template molecule is selected from the group consisting of: flavones, alkyl- or hydroxyl-substituted flavones, isoflavones, alkyl- or hydroxyl-substituted isoflavones, amino acids, antibiotics, steroids, peptides, polypeptides, proteins, aromatic molecules, hydroxylated aliphatic molecules, and molecules that are structural analogs thereof. More preferably, the template molecule is selected from the group of flavones consisting of: estradiol benzoate, phenol, genistein, daidzein, glycitein, genistin, daidzin, glycitin, malonyl genistin, malonyl daidzin, malonyl glycitin, acetyl genistin, acetyl daidzin, acetyl glycitin, and molecules that are structural analogues thereof. The at least one template molecule comprises about 5–15% (mass basis) of the total mass of the at least one monomer plus the at least one template molecule.

The at least one monomer is selected from the group consisting of crosslinking monomers and functional monomers. More preferably, at least one monomer is ethylene glycol dimethacrylate (EGDMA).

In the process, the polymerization initiator system is selected from the group consisting of: a thermal free radical initiator, a UV free radical initiator, and a gamma radiation free radical initiator. More preferably, the polymerization initiator system is a thermal free radical initiator. Where the temperature of the suspending medium is not less than 20° C. below the half-life temperature of the thermal free radical initiator, the half-life being one hour in a hydrocarbon medium.

The porogen used in the process is about 1 to 50 volume percent of the combined volume of the at least one monomer. Preferably, the porogen has a solubility parameter within 2δ of the forming molecularly imprinted polymer. Additionally in the process, the porogen has a solubility in water at 20° C. of more than 2 percent weight, relative to the total weight of the suspending medium and the porogen. The preferred porogen is selected from the group consisting of tetrahydrofuran, acetonitrile, $CH_2Cl_2$, $CHCl_3$, N-methylpyrrolidone, toluene, ethyl acetate, 1,2-dichloroethane, methanol, alcohols, acetone, and ethyl acetate.

In the process, droplets are formed by passing the monomer-template reaction mixture through an orifice, wherein the orifice and suspending medium are non-stationary relative to one another.

In another embodiment, the suspending medium is agitated mechanically from 1 to 1000 rpm or ultrasonically agitated.

The suspending medium used in the process contains energy required for polymerization, preferably the suspending medium is heated. The suspending medium may be comprised of at least water. More preferably, the water is a majority by weight of the suspending medium and the suspending medium further comprises at least one compound selected from the group consisting of hydroxyethylcellulose, polyvinylalcohol, polyvinylpyrrolidone, propylene glycol, ethylene glycol, polyethylene glycol, and polypropylene glycol.

The polymerization of step (a) of the process occurs by free radical polymerization, by condensation polymerization, and/or via radiation within the wavelengths of about 150–350 nm.

The process produces spheroidal primary particles, at least 75% of the molecularly imprinted polymer spheroidal primary particles ranging in size from 1 μm to 1 mm in diameter.; more preferably at least 70% of the molecularly imprinted polymer spheroidal primary particles ranging in size from 10 to 400 μm in diameter. Preferably, the process produces the spheroidal primary particles having a surface area greater than about 150 $m^2$/g when measured by nitrogen porosimetry.

A further embodiment of the invention is a process for adsorbing molecules from a sample comprising
  a) contacting a molecularly imprinted polymer produced by the process described above with a sample containing a target analyte; and
  b) extracting the target analyte from the molecularly imprinted polymer.
Preferably, the sample is a soy whey and the target analyte is an isoflavone.

A further embodiment of the invention is a droplet polymerization process to form a molecularly imprinted polymer, comprising the steps of:
  a. releasing a monomer-template reaction mixture, comprising:
    i. at least one monomer selected from the group consisting of functional monomers and crosslinking monomers;
    ii. at least one template selected from the group consisting of estradiol benzoate, phenol, genistein, daidzein, glycitein, genistin, daidzin, glycitin, malonyl genistin, malonyl daidzin, malonyl glycitin, acetyl genistin, acetyl daidzin, and acetyl glycitin;
    as droplets from an orifice into a liquid suspending medium, wherein at least one of the monomer-template reaction mixture and the liquid suspending medium further comprises a polymerization initiator system, whereby polymerization of the droplets is at least substantially completed in the suspending medium; and
  b. recovering the molecularly imprinted polymer from the suspending medium; and
  c) extracting the template from the molecularly imprinted polymer before or after step (b).
A further embodiment of this process includes the monomer-template reaction mixture further comprising
    iii. at least one porogen selected from the group consisting of tetrahydrofuran, acetonitrile, $CH_2Cl_2$, $CHCl_3$, N-methylpyrrolidone, toluene, ethyl acetate, 1,2-dichloroethane, methanol, alcohols, acetone, and ethyl acetate; and/or
    iv. at least one solvent.

Yet another embodiment of the invention is a droplet polymerization process to form a molecularly imprinted polymer for use in adsorbing a target analyte from a sample, comprising the steps of:
  a. releasing a monomer-template reaction mixture, comprising:
    v. at least one monomer selected from the group consisting of functional monomers and crosslinking monomers;
    vi. at least one template selected from the group consisting of estradiol benzoate, phenol, genistein, daidzein, glycitein, genistin, daidzin, glycitin, malonyl genistin, malonyl daidzin, malonyl glycitin, acetyl genistin, acetyl daidzin, and acetyl glycitin;
  as droplets from an orifice into a liquid suspending medium, wherein at least one of the monomer-template reaction mixture and the liquid suspending medium further comprises a polymerization initiator system, whereby polymerization of the droplets is at least substantially completed in the suspending medium;
  b) recovering the molecularly imprinted polymer from the suspending medium;
  b) extracting the template from the molecularly imprinted polymer before or after step (b);
  c) contacting the molecularly imprinted polymer with a sample comprising a target analyte; and
  d) separating the target analyte from the molecularly imprinted polymer.
The process to form a molecularly imprinted polymer for use in adsorbing a target analyte from a sample may also have a monomer-template reaction mixture further comprising
    vii at least one porogen selected from the group consisting of tetrahydrofuran, acetonitrile, $CH_2Cl_2$, $CHCl_3$, N-methylpyrrolidone, toluene, ethyl acetate, 1,2-dichloroethane, methanol, alcohols, acetone, and ethyl acetate; and/or
    viii. at least one solvent.

The process is preferably operated where the at least one monomer is is ethylene glycol dimethacrylate (EGDMA); the at least one template is selected from the group consisting of flavones, alkyl- or hydroxyl-substituted flavones, isoflavones, alkyl- or hydroxyl-substituted isoflavones, amino acids, antibiotics, steroids, peptides, polypeptides, proteins, aromatic molecules, hydroxylated aliphatic molecules, and molecules that are structural analogs thereof; the liquid suspending medium comprises water; the polymerization initiator system is a thermal free radical initiator; and the target analyte is an isoflavone.

DETAILED DESCRIPTION OF THE INVENTION

Applicants' have solved the stated problem by developing a droplet polymerization method to produce adsorptive and catalytic molecularly imprinted polymers. The present invention minimizes disruption of the monomer-template interactions, since the monomer-template reaction mixture rapidly polymerizes upon entry into the suspending medium. Briefly, the method involves providing a monomer-template reaction mixture and a liquid suspending medium; releasing ("dripping") the monomer-template reaction mixture as droplets from an orifice into the liquid suspending medium; and recovering the molecularly imprinted polymer so produced. Little or none of the monomer-template reaction mixture leaches into the liquid suspending medium before the polymerization is substantially complete. Specifically, interactions between the monomers and template molecules, without interference from the suspending medium, occur in the monomer-template reaction mixture. Then, this reaction mixture is preferably released into a heated suspending medium as small droplets (approximately 10 μm to about 500 μm), whereby polymerization of each individual droplet rapidly occurs with minimum disruption to the template-monomer interactions. This droplet polymerization method overcomes the drawbacks of bulk polymerization, suspension polymerization, and surface polymerization, as discussed in the Background section of this application.

The present droplet polymerization method is particularly well suited for industrial scale formation of MIPs possessing improved binding affinity, uniform particle size distribution, and good mass transfer performance. The method is simple, cost effective, and efficient. Although applicable to many industrial processes, preferred embodiments of the invention are useful for separation and recovery of isoflavones.

Advantages of the Droplet Polymerization Method

The droplet polymerization method of the instant invention yields MIPs with greater adsorptive activity and improved imprinting efficiency compared to those produced by other molecular imprinting methods.

The benefits of the disclosed droplet polymerization method for creation of MIPs are thought to arise from uncoupling template site formation from particle formation. Further, efficacious imprinting occurs because polymerization of each small droplet is rapid, thereby retaining good MIP particle morphology and preventing the suspending medium from solubilizing the template away from the monomer(s) prematurely.

Another advantage of the present invention is that templates that are very soluble in the suspending medium can be used for imprinting, since the monomer-template interactions occur in the absence of the suspending medium. For instance, one often wants to use a water-soluble template (e.g., a moderately polar compound) in an aqueous suspending medium, yet is unable to form strong monomer-template interactions. The instant method allows such a water-soluble template to be used with water as the primary component of the suspending medium, since polymerization takes place rapidly once the reaction mixture droplet contacts the suspending medium. When using thermal polymerization, the template will preferably have a solubility in the suspending medium of about 0.5 weight percent or more, more preferably about 1.0 weight percent or more, at the temperature of the polymerization process. This takes advantage of the process' ability to form an MIP in a suspending medium in which the template molecule(s) is soluble.

Finally, the present invention uses equipment that is readily available and compositions of suspending media that are environmentally friendly.

Definitions

In this disclosure, a number of terms and abbreviations are used. The following definitions are provided, to further understanding of the invention. Terminology applies throughout the disclosure, unless specifically stated otherwise.

"High performance liquid chromatography" is abbreviated HPLC.

"N-methyl pyrrolidone" is abbreviated NMP.

"Tetra hydro furan" is abbreviated THF.

The term "molecularly imprinted polymer" (MIP) refers to a polymer that has undergone molecular imprinting with a template, whereby the resulting organic or inorganic polymer contains selective adsorptive or catalytic sites that are complementary to the original template molecule used for imprinting. Imprinting the polymer is achieved either by utilizing 1) non-covalent interactions such as hydrogen bonds or ion-pair interactions; or 2) reversible covalent interactions between the template and the monomers.

The term "molecular imprint" refers to a void at, on, or within a polymer, the void having complementarity to functional groups on the surface of the void, both sterically and chemically, to the chemically functional groups of the template molecule. For purposes of this invention, it is desirable that the imprint remains stable after the template molecule is extracted from the molecularly imprinted polymer.

The terms "template molecule(s)" or "molecular imprint molecule(s)" refer to a molecule(s) used to imprint the monomer. They are identical to, or structurally analogous to, analytes to be adsorbed by the MIP.

The term "monomer-template reaction mixture" or "reaction mixture" refers to a mixture that minimally comprises one or more template molecules and one or more monomers. Generally, the mixture will contain as monomer one or more crosslinking monomers, and optionally, one or more functional monomers. Preferably, the monomer-template reaction mixture will contain a polymerization initiator system. Optionally, porogen(s) and solvent(s) may additionally be included in the monomer-template reaction mixture.

"Monomer-template interactions" refer to those interactions that occur between the template and the monomers prior to polymerization. It is desirable for these interactions to be very specific (in the form of many non-covalent interactions or reversible covalent interactions) between the template and the monomers, because the specificity of the initial interactions between monomer and template dramatically affect the specificity of the created MIP.

"Monomers" are defined as those molecules that can undergo polymerization, thereby contributing discrete units to the essential structure of a polymer. Typically, monomers can be classified as either functional or crosslinking monomers. Both functional and crosslinking monomers contain various chemical functionalities (e.g., hydroxy-, methyl-, carboxyl-, etc.) which interact with the groups on the template molecule via non-covalent or reversible covalent bonds, thereby assisting in forming polymer with a molecular imprint. These groups are also used by the MIP to bind analyte within the molecular imprint of the polymer. Functional and crosslinking monomers are distinguished, however, according to the number of polymerizable groups present on the molecule.

"Functional monomers" are those monomers that contain a single polymerizable group (e.g., a vinyl group). Upon polymerization, functional monomers are only able to produce long "chains" of polymers, but these "chains" are not directly interconnected and thus the polymer is not stable.

"Crosslinking monomers" contain two or more polymerizable groups (e.g., multiple vinyl groups) which can take part in a polymerization process. Thus, for example, these are often referred to as di-, tri-, and tetra-functional monomers. Crosslinking monomers enable interconnection of polymer "chains", to produce a highly cross-linked polymer structure.

An "acrylic monomer" is a monomer derived (at least in part) from acrylic acid (e.g., acrylic acid, acrylic acid esters, acrylamide, and acrylonitrile). In contrast, a "methacrylic monomer" will refer to a monomer derived (at least in part) from methacrylic acid, in a manner analogous to that of acrylic acid. A "styrene monomer" will refer to a compound having a vinyl group attached to an aromatic ring (e.g., styrene itself, dinvinylbenzene, and α-methylstyrene).

A "polymerization initiator system" or an "initiator" refers to a system or agent which causes a chemical reaction to begin and which enters into the reaction to become part of the resultant compound. Initiators differ from catalysts in that catalysts do not combine chemically with the reactants.

The term "porogen" refers to a compound or compounds that are miscible in the monomer-template reaction mixture, are preferably readily extractable into the suspending liquid, aid in the formation of pores in a MIP, and do not serve the function of a monomer or a template molecule as defined herein. Examples of porogens include but are not limited to alcohols, water-soluble ethers (e.g., tetra hydro furan), and carboxylic acids.

The term "suspending medium" refers to a liquid into which a monomer-template reaction mixture is released (e.g., "dripped") and which is capable of containing energy required for polymerization. Thus, for instance, the suspending medium must be able to hold thermal energy upon heating (when one desires to polymerize using a thermal free radical initiator), or to maintain radiation energy upon exposure to gamma radiation (when one desires to polymerize using a gamma free radical initiator).

The term "dripping the monomer-template reaction mixture" refers to the process whereby the monomer-template reaction mixture is released, transported, or permitted to pass through an orifice, such that droplets are formed. This definition also encompasses the process by which a continuous stream of monomer-template reaction mixture is converted to droplets via mechanical, ultrasonic, or other comparable means.

The term "droplet" refers to a finite volume of liquid with approximate spheroidal morphology. In general, droplets in the instant invention are between 1 $\mu$m to 1 $\mu$m in diameter.

"Polymerization" will refer to the process of converting a monomer (or a mixture of monomers) into a polymer, where a polymer is a molecule of high relative molecular mass, the structure of which essentially comprises the multiple repetition of monomer units from which the polymer is derived.

"Primary particles" refers to those molecularly imprinted particles that are a product of the droplet polymerization method disclosed herein. These primary particles typically are spheroidal in shape; thus, they are particles shaped like a sphere but not perfectly round. In contrast, "macroparticles" refer to the particles produced when two or more primary particles partially or completely aggregate with one another. "Analyte" or "target analyte" refers to a molecule that may be separated or resolved using a specific MIP. Thus, the analyte must be identical in molecular structure to the template molecule, or at the least possess distinct similarities to the template molecule (e.g., sterically and chemically, on the basis of 3-dimensional molecular structure, location and number of functional groups, and electrostatic potential).

"$\delta$" is the unit to measure solubility and is expressed as the square root of MegaPascals ($MPa^{1/2}$). Values of solubility parameters for a wide variety of materials are tabulated in *Handbook of Solubility Parameters and Other Cohesion Parameters*, (A. F. M. Barton, CRC Press, Boca Raton, Fla., 1991) and *Polymer Handbook*, $2^{nd}$ Ed., (J. Brandrup et al., Eds. John Wiley & Sons Inc. New York 1975, Pages IV-337-IV-359).

The Droplet Polymerization Method

In the present invention, an efficacious MIP is created by releasing droplets of a monomer-template reaction mixture into a suspending medium (e.g., water). The monomer-template interactions are permitted to form in the monomer-template reaction mixture, before the reaction mixture's introduction into the suspending medium. Optionally, partial polymerization can take place prior to introduction of the droplets into the suspending medium. Once the droplets are exposed to the suspending medium, they at least substantially polymerize due to the small droplet size and the energy content (e.g., thermal, UV, etc.) of the suspending medium. The rapid polymerization (typically occurring within about 10 seconds) is thought to minimize significant disruption of monomer-template interactions by the suspending medium, thereby permitting formation of MIPs with increased template selectivity. MIPs formed preferably achieve a spheroidal morphology.

Extracting the template molecules from the created MIP can be achieved either passively or actively, before recovery of the MIP. This method permits polymerization and template extraction to occur in the same vessel and with the same suspending medium. This eliminates the need for additional process steps that are required for other methods of MIP synthesis. Optionally, the MIP may be recovered first, followed by extraction of the template molecules.

The Monomer-Template Reaction Mixture

The monomer-template reaction mixture minimally comprises one or more template molecules and one or more monomers. In general, it is desirable to have a ratio of monomer:template greater than 1:1 in molar concentration in the monomer-template reaction mixture. Additionally, this reaction mixture may optionally comprise an initiator, a porogen(s), and a solvent(s). Each of these components will be discussed below in greater detail.

Template Molecules and Analytes

A wide variety of template molecules have been used to create MIPs having selective recognition matrices. Examples of molecules or compounds previously used as templates include drugs, amino acids, carbohydrates, proteins, nucleotide bases, hormones, pesticides and co-enzymes.

Template selection reflects several factors. One factor to be evaluated is the size of the template or the size of analyte to be captured selectively on the MIP. Typically, MIPs can be formed with relatively low-molecular weight compounds (i.e., up to approximately 1000 MW) as the template; but, some MIPs have been formed with affinity for larger compounds, e.g. proteins or cells, via surface imprinting (see, for example, H. Shi and B. D. Ratner, *J. Biomedical Materials Res* 49(1):1–11(2000)). Since the polymer forms around the template, the template must be able to diffuse out of the polymeric network after polymerization. Larger molecules will have difficulties in diffusing from the polymer and will thus remain trapped, blocking the binding of any analyte.

A second selection factor to consider is the ability of the template molecule to interact with the crosslinking and functional monomer(s) via non-covalent (e.g., hydrogen bonds, ion-pair interactions) or reversible covalent bonds. Of the imprinting strategies used in the past, it has become evident that the use of non-covalent interactions between the template and the monomers is the more versatile approach.

The apparent weakness of these interaction types, when considered individually, may be overcome by allowing a multitude of interaction points simultaneously. Further advantages are realized due to the fast association and dissociation kinetics of these bond types, which allow many possible combinations to be checked before the correct partners associate in a short period of time. Finally, the use of non-covalent interactions in the imprinting step closely resembles the recognition pattern observed in nature, whereby biological molecules (e.g. DNA, proteins, etc.) use non-covalent interactions to self-assemble, much as the template and monomers use non-covalent interactions to ultimately form the imprint.

Selection of a template molecule also involves considering whether it is more desirable to use a structural analogue of the analyte as the template. This may be desirable for various reasons. For instance, when the MIP is created for the purpose of performing especially sensitive quantitations of an analyte, erroneous results could occur if the template molecule was identical to the analyte and remained associated with the MIP following template extraction. Generally, up to 99% of the template molecules can easily be removed by extraction, but the remaining 1% may constitute a problem for removal. If a structural analogue was used as the template molecule, difficulties concerning subsequent quantification of analyte would be prevented. A second reason to use a structural analogue as the template molecule instead of the analyte itself arises when the template (and associated analyte) is extremely expensive. Use of a less expensive structural analogue in this instance can reduce the costs of producing the MIP.

In either situation, the structural analogue selected should have the following properties:

1) it should preferably contain the same functional groups as the analyte that gives recognition;
2) it should not interfere with the analyte in the analytical system;
3) it should be soluble in the reaction mixture;
4) it should be stable during polymerization; and
5) it should not be present in such large amounts in the sample to be resolved or separated, as to compete with the analyte for the binding sites.

As is well known in the art, occasionally a MIP is "too specific" to adsorb a mixture of compounds (i.e., more than one analyte) where this is desirable. In these situations, it is possible to reduce the specificity of the MIP in a variety of ways. First, it is possible to use a "less crosslinking monomer" in the monomer-template reaction mixture, thereby producing a MIP that has less rigidity (to be discussed below). The term "less crosslinking monomer" is used to refer to a less reactive crosslinking monomer, a crosslinking monomer with fewer polymerizable groups, less mass of the same crosslinking monomer, or any combination of these characteristics thereof. MIPs formed in this fashion will often allow more than one analyte to bind to the MIP. Secondly, it is possible to reduce the specificity by using as a template a structural analogue that yields a more "generic" imprint. This allows all of the analytes of interest to become selectively adsorbed by a single imprint. Finally, it is possible to simultaneously use more than one template molecule when making the MIP. This strategy will produce a multi-imprinted MIP that is able to selectively bind more than one analyte.

Useful templates in the instant invention include, but are not limited to: flavones (and alkyl- or hydroxyl-substituted flavones), isoflavones (and alkyl- or hydroxyl-substituted isoflavones), antibiotics, steroids, peptides, polypeptides, proteins, aromatic molecules, hydroxylated aliphatic molecules, hydroxylated ring compounds (e.g., phenol, para-hydroxybenzoic acid, para-hydroxycinnamic acid, hydroxystyrene), polyhydroxylated small molecules (molecular weight<500) (e.g., 1,3-propanediol), amino acids (e.g., leucine, phenylalanine), butyrolactone, methylene butyrolactone, methylated forms of methylene butyrolactone, and molecules which are considered to be structural analogs of these molecules.

Specific isoflavones considered as useful templates include daidzin, genistin, glycitin, daidzein, glycitein, genistein, malonyl ester forms of daidzin or genistin or glycitin, and acetyl ester forms of daidzin or genistin or glycitin. Estradiol benzoate and phenol are useful templates that can serve as structural analogs to isoflavones. One skilled in the art would be able to deduce other appropriate structural analogs that could be used as a template molecule for a given analyte.

In a preferred embodiment, the template(s) concentration is 5–15% (mass basis) of the total mass of monomer(s) plus template(s).

The particular molecule used as the template will determine the analyte(s) that the resulting MIP will be capable of separating or resolving. The recognition of the analyte is dependent on selective interactions based on hydrogen bonding, ion exchange, and hydrophobic interactions. In general, the selectivity increases with the number and the type of interactions between the MIP and the analyte.

Functional and Crosslinking Monomers

The monomer-template reaction mixture will contain at least one monomer. Traditionally, one or more functional monomers and one or more crosslinking monomers are used for creation of MIPs; however, it is also possible to form MIPs using one or more crosslinking monomers without the addition of one or more functional monomers.

Conventionally, the particular functional monomer(s) used in a monomer-template reaction mixture depends on the particular chemical properties of the analyte that the MIP is being made to select for or separate. This correspondence occurs because the functional monomer is the primary component involved in forming effective chemical bonds with the template molecule (during MIP formation) and with the analyte (during sample resolution and separation). Functional monomers have single polymerizable units that eventually react to form the polymer. These monomers have specific chemical functionalities (e.g. carboxyl, hydroxyl, amino or aromatic groups) which can bind to the template molecule covalently and/or non-covalently.

In the present invention, functional monomers are preferably selected from the group consisting of free-radical polymerizable monomers, such as vinyl-containing monomers. More preferred functional monomers are selected from the group consisting of acrylics, methacrylics, and styrenes. Examples of commonly used functional monomers include methyacrylic acid, vinylpyridine, and styrene.

Equally important to the functional monomers are the relative amounts and types of crosslinking monomers used in the monomer-template reaction mixture. In general, the purpose of the crosslinking monomers is to: 1) "fix" the functional monomer in a specific orientation relative to the template molecule (thereby affecting the overall specificity of the MIP, or "recognition behavior"); and 2) to control the resulting MIP's structural rigidity. Crosslinking monomers may also function as the sole or primary component involved in forming effective chemical bonds with the template molecule (during MIP formation) and with the analyte (during resolution and separation).

Historically in the field of molecular imprinting, only a limited number of crosslinking monomers have been utilized, and they have not been previously used to form polymers without functional monomers. This may be due to concern regarding the solubility of the crosslinking monomer itself in the monomer-template reaction mixture and the solubility of the monomerized template species, as both factors reduce the number of possible alternatives. Nevertheless, several different crosslinking monomers have been tried with different degrees of success, including: isomers of divinylbenzene for crosslinking of styrene and other functional monomers into polystyrenes, acrylic or methacrylic acid-based systems, ethylene glycol dimethacrylate (EGDMA), and trimethylolpropane trimethacrylate (TRIM). Additionally, tri- and tetrafunctional acrylate crosslinkers (e.g., pentaerythritol triacrylate (PETRA), pentaerythritol tetraacrylate (PETEA)) have recently been used for the preparation of peptide-selective molecularly imprinted polymers ((Kempe, M. *Anal. Chem.* 68(11): 1948–53 (1996)), while a crosslinking monomer containing two amide functionalities flanking a pyridinyl moiety has been used in an imprinting protocol against barbiturates (WO 2001055095 A1).

In the present invention, crosslinking monomers are molecules containing multiple polymerizable units, such as molecules containing multiple vinyl groups. Preferred crosslinking monomers are selected from the group consisting of acrylics, methacrylics, and styrenes. Examples of more preferred crosslinking monomers include ethylene glycol dimethacrylate and divinylbenzene.

Selection of functional and crosslinking monomers used in forming a particular MIP are based on the desired rigidity of the polymer (determined according to the particular crosslinking monomer selected, as well as its molar composition) and the desired functional groups to interact with the template molecule.

Polymerization Initiator System

Polymerization requires a polymerization initiator system in either the monomer-template reaction mixture, the suspending medium, or in both the monomer-template reaction mixture and the suspending medium. Preferably, the monomer-template reaction mixture will contain a polymerization initiator system. The specific initiator used within a given monomer-template reaction mixture is selected on the basis of the type of polymerization to be performed (discussed below). In general, free radical initiators are required to perform free radical polymerizations, while catalysts are sometimes required to perform condensation polymerizations. The function of the initiator or catalyst is to cause polymerization to begin.

A variety of free radical initiator systems exist, including thermal free radical initiators, UV free radical initiators, and gamma radiation free radical initiators. These systems all possess an atom or group of atoms having at least one unpaired electron upon activation. Additionally, most free radicals are short-lived intermediates with high reactivity and high energy, making their isolation difficult. Typically, a very small amount of initiator is required (usually under 2% by weight, relative to the monomer-template reaction mixture).

Preferred thermal free radical initiators useful in the present invention include, but are not limited to, azonitrile initiators (e.g., 2,2'-azo-bis-isobutyronitrile, 2'-azodi(2,4-dimethylvaleronitrile), 2,2'-azodi(2-methylbutyronitrile)), alkyl peroxides (e.g., tert-butyl peroxide), and acyl peroxides (e.g. benzoyl peroxide).

It would be readily apparent to one skilled in the art that a polymerization initiation system alternatively could be incorporated into the suspending medium instead of into the monomer-template reaction mixture, without significantly altering the spirit or scope of the present droplet polymerization method.

Porogens

Porogens function by creating pores in the polymer during the polymerization process. Applicants have discovered that the presence of a porogen in the monomer-template reaction mixture often yields a MIP with higher surface area than results in the porogen's absence. Adsorbents with higher surface area are generally preferred because high surface area allows better solvent accessibility and thus better mass transfer characteristics.

Previous MIP studies have used porogens in bulk/solution polymerization and, to a limited degree, for suspension polymerization. In the bulk/solution polymerization work, the porogens used are THF, acetonitrile, $CH_2Cl_2$, $CHCl_3$, NMP, toluene, ethyl acetate, 1,2-dichloroethane, and methanol (Meng et al., *Chinese J. Chromatography*, 17:4(1999); Sellergren, *J. Chromatography A*, 673:133-141(1994)). For the present invention, preferred porogens include THF, acetonitrile, $CH_2Cl_2$, $CHCl_3$, NMP, toluene, ethyl acetate, 1,2-dichloroethane, methanol, other alcohols (e.g. cyclohexanol, dodecylalcohol), acetone, and ethyl acetate. One skilled in the art would recognize other molecules that would be soluble in the suspending medium and could function effectively as a porogen.

In a preferred embodiment, polymerization occurs in the reaction mixture in the presence of a porogen that can later be extracted from the polymer, preferably by the suspending medium. The porogen preferably has a solubility in water at 20° C. of 1 weight percent or more, and more preferably about 2 percent of more, based on the total weight of the water and the porogen. When a water-soluble porogen is used, it may easily be removed by extracting with water, a cheap and environmentally friendly solvent. It is preferred that the porogen be about 1 to about 50 percent (more preferably about 1 to about 10 percent) by combined volume of the functional monomers and crosslinking monomers. In some instances it is preferred that the porogen have a solubility parameter within $2\delta$, and preferably within $1\delta$, of the forming polymer.

Solvent

Optionally, one or more solvents may be included in the monomer-template reaction mixture. Solvents can be different from porogens, as solvents generally do not create pores in the MIP formed. Solvents may be beneficial for a particular polymerization by aiding in the solubilization of monomers, template, or initiator. Examples of typical solvents include hexane, ethylene glycol, 1,5-dimethyl-2-piperidone, and N,N-dimethylformamide.

Suspending Medium

The "suspending medium" of the instant invention refers to any liquid into which the monomer-template reaction mixture is released or "dripped" and which is capable of containing energy required for polymerization. This energy for polymerization can be, for example, thermal energy or radiation energy. It is preferable that the monomer-template reaction mixture be predominantly insoluble in the suspending medium.

Suspending Medium Composition

As is well known in the art, the specific properties of the suspending medium will affect the size of the monomer-template reaction mixture droplets when they enter the suspending medium, the resulting size of the MIP that forms upon polymerization of the droplets, the pore size of the created MIP, and even template extraction from the MIP. Thus, selection of the specific composition of a suspending medium typically requires optimization through experimentation for each new template and MIP.

Suspending media that can be used in the present invention include, but are not limited to: water, alcohols (e.g., methanol, ethylene glycol), alkanes (e.g., pentane), solvents (e.g., acetone, chloroform, DMF, NMP), and mixtures thereof. This is in contrast to the suspending medium exemplified in U.S. Pat. No. 5,872,198 and U.S. Pat. No. 5,959,050 (i.e., perfluorocarbons), which typically requires a fluorinated surfactant, associated capital-intensive solvent recovery systems, significant power input to prevent bulk phase separation, and a means to handle the environmentally unfriendly compounds.

In a preferred embodiment, the suspending medium is water.

A variety of additional components may be incorporated into the final composition of the suspending medium. For example, the suspending medium may further comprise one or more of hydroxyethylcellulose, polyvinylalcohol, polyvinylpyrrolidone, propylene glycol, ethylene glycol, polyethylene glycol, or polypropylene glycol. Each of these compounds can modify the rheology of the suspending medium and thus alter the size and surface area of the resulting MIP in ways familiar to those of skill in the art.

Or, the suspending medium could optionally contain a polymerization initiator system. This would be necessary if the monomer-template reaction mixture did not contain a polymerization initiator; however, some advantages may also be obtained by including a polymerization initiator system in both the monomer-template reaction mixture and the suspending medium. For example, the initiator in the suspending medium could help the suspending medium contain additional energy required for polymerization.

Finally, the suspending medium could contain a surfactant, typically less than 1% by weight of suspending medium, in order to permit modification of the surface tension of the suspending medium. This component would also permit regulation of the MIP's size and surface area.

Suspending Medium Agitation

The easiest method to prevent premature droplet coalescence and thereby permit polymerization of spheroidal MIPs is to apply agitation to the suspending medium. Without agitation of the suspending medium, the monomer-template reaction mixture droplets would likely coalesce in the suspending medium before polymerization was complete, unless the flow rate of the monomer-template reaction mixture (and therefore droplet formation) was relatively slow. No agitation would create numerous non-spheroidal macroparticle aggregates. Means to achieve the required agitation include mechanically generated agitation (1–1000 rpm), ultrasonic agitation, bulk fluid flow caused by some other means, or similar methods.

One way to circumvent the need for agitation would be for the orifice (from which the monomer-template reaction mixture droplets emerge) to move, for example, in a pattern over the surface of the non-agitated suspending medium. This motion would minimize the chance of droplet coalescence (or at least minimize the coalescence), such that more time would be permitted for each droplet's polymerization into a spheroidal MIP. More generally phrased, the orifice and the suspending medium are non-stationary with respect to each other.

Of course, one possessing skill in the art will recognize that a continuous polymerization process is also achievable via the droplet polymerization process described herein. In this embodiment, the monomer-template reaction mixture is dripped into a vessel containing the suspending medium, wherein the suspending medium and/or molecularly imprinted polymer particles are continuously withdrawn. Clearly, if the suspending medium is continuously removed, fresh or recycled suspending medium must be added to the vessel where polymerization is occurring.

Association of the Monomer-Template Reaction Mixture

In the present invention, the formation of an MIP with high specificity for the template molecule uncouples template site formation from particle formation (processes which permit disruptions to the template-monomer interactions when performed together). Specifically, template site formation takes place in the absence of a suspending medium (or in greatly reduced quantities of suspending medium), thus preventing: 1) the suspending medium from saturating the monomer-template reaction mixture; and/or 2) the template from leaching into the suspending medium; and/or 3) disruption of the template-monomer interactions due to the energy of the suspending medium (if any) or solvents incorporated into the suspending medium composition. Monomer-template interactions are assumed to occur within microseconds of their association. This permits efficacious imprinting of templates because the monomer-template interactions occur in isolation from the suspending medium and because such interactions are locked in via rapid polymerization once the reaction mixture contacts the suspending medium.

This understanding is in contrast to some prior art which teaches mixing of the monomer and template mixture, followed by addition of this mixture to solvent or suspending medium under non-polymerizing conditions, followed by initiation of polymerizing conditions [Lei Ye, O. Ramstrom, and K. Mosbach, *Anal. Chem.* 70:2789–2795 (1998)]. The lag between initiation of polymerizing conditions and maximum rate polymerization can be substantial— e.g., turning on a heating jacket to elevate bulk temperature. Since non-covalent interactions typically occur on the microsecond scale during this lag, the monomer and template undergo numerous non-covalent interactions with all the other components, including solvent or suspending medium, porogens, and the like. These other non-covalent interactions disrupt the crucial monomer-template interactions and result in lower MIP affinity.

The "Dripping" Method

An essential element of the present invention for droplet polymerization requires that the monomer-template mixture be released or transported (i.e., "dripped") into the suspending medium in the form of small droplets. These droplets are preferably about 1 $\mu$m to 1 cm in diameter. When droplets are created by passing through an orifice, as is well known in the art, the size of the droplets depends on 1) the diameter of the orifice through which the monomer-template reaction mixture passes, 2) the flow rate of the monomer-template reaction mixture, 3) the physical properties of the monomer-template reaction mixture (e.g., viscosity, surface tension, temperature), and 4) the material for which the orifice is formed. Orifices, for example, may be formed of metal, glass, plastic, or even rubber. When droplets are formed via interruption of a continuous stream of monomer-template reaction mixture via mechanical, ultrasonic, or other comparable means, droplet size would be controlled by the revolution rate of the mechanical device, or by the frequency and intensity of the ultrasonic source.

Optionally, the monomer-template reaction mixture may be exposed to partially polymerizing conditions (thereby "pre-polymerizing") before contact with the suspending medium where the polymerization will be completed. This partial polymerization allows a "locking in" of the monomer-template interactions and increases the viscosity of the monomer-template solution, which further slows template leaching from the monomer once the droplet enters the suspending medium. For example, a partial polymerization may increase the viscosity of the reaction mixture by more than 0.1 centipoise, but not to the gel point, relative to the viscosity of the untreated reaction mixture. This optional partial polymerization step must still permit droplets to be formed, before the droplets contact the suspending medium.

Polymerization Methods

In general, there are two major categories of polymerization reactions: condensation polymerization and free radical polymerization. Condensation polymerization arises when covalent bonds are rearranged in such a way that two monomers are connected together and a small molecule (typically water) is "condensed" out. This type of polymerization requires the presence of functional groups that will allow for the creation of a small molecule and the bond that increases the length of the polymer chain. There are several types of polymer materials that commonly form by condensation reactions, including nylon, polyesters, rayon, and spandex. The scope and spirit of the present invention would include polymerization by condensation.

Free radical polymerization involves the reaction of monomer carbon-carbon double bonds with an unpaired electron on a radical. Generally, the propagating species is a long chain free radical, usually initiated by the attack of free radicals derived by thermal or photo-chemical decomposition of appropriate initiators. Polymerization itself proceeds by the chain reaction addition of monomer molecules to the free radical ends of growing chain molecules, via "attack" of each monomer's carbon-carbon double bond. Polymerization is completed when two propagating species (growing free radicals) combine or disproportionate to terminate the chain growth and form one or more polymer molecules.

Free radical polymerization is one of the most common polymerization methods for the preparation of MIP. The method includes thermal free radical polymerization, radiation-induced free radical polymerization (e.g., ultraviolet, gamma), chemical methods known to create free radicals (e.g. peroxides), and photopolymerization. For example, photopolymerization may be used by mixing photoinitiators and, optionally, photosensitizers into the monomer-template reaction mixture, "dripping" this reaction mixture into the suspending medium, and then exposing the droplets to light. A review of the polymerization methods mentioned above can be found in *Polymer Handbook*, 4th Edition (J. Brandup, E. H. Immergut, and E. A. Grulke, Eds; J. Wiley & Sons, 1999).

In a preferred embodiment of the instant invention, the free radical source is often a compound that decomposes to yield free radicals upon heating to a characteristic temperature. The free radicals then catalyze the polymerization of the monomer(s) present in each droplet of monomer-template reaction mixture. At least substantially complete polymerization occurs rapidly, when the suspending medium is maintained at a temperature at which the free radical initiator present in the monomer-template reaction mixture decomposes rapidly.

In another preferred embodiment, rapid polymerization takes place when the suspending medium is at a temperature not less than 20° C. below the half-life temperature of the thermal free radical initiator (wherein the half-life is one hour in a hydrocarbon medium). More preferably, the suspending medium is at a temperature not less than 10° C. below the half-life temperature of the thermal free radical initiator; even more preferably not less than 5° C. below; and most preferably not less than the half-life temperature at one hour from when the reaction mixture droplets initially contact the suspending medium. If the reaction mixture also contains materials other than template, monomer, and initiator, it is also preferred that little or none of those additional components leach from the reaction mixture droplets into the suspending medium before polymerization is substantially complete. However, after the droplets are substantially polymerized, leaching of soluble materials may take place. In some instances, this leaching may even be desirable (for example, the passive leaching of the template molecule as a technique for template extraction).

Independent of the particular method of polymerization applied, it is proposed that superior MIPs are formed using the present droplet polymerization method (as compared to those MIPs synthesized using traditonal bulk, suspension, or surface polymerization methods) due to rapid polymerization of each droplet. Specifically, the functional and crosslinking monomers surrounding the template molecules within each droplet of monomer-template reaction mixture rapidly polymerize upon entering the suspending medium as spheroidal droplets, in large part due to the small size of the droplets and the energy content of the suspending medium. Although difficult to quantify, it is expected that most droplets fully polymerize within about 1 min of entering the suspending medium, and preferably within about 10 sec. As a result of this rapid polymerization, little disruption occurs to the monomer-template interactions. This maintains close distances between the template and monomers and results in creation of a true and accurate imprint of the template molecule, yielding a MIP with increased recognition specificity.

The present imprinting invention overcomes many of the problems associated with techniques of the prior art. In the prior art, the monomer-template reaction mixtures are optionally subjected to a period for pre-association. Then, the monomer-template reaction mixtures are typically subjected to prolonged heating in the presence of large excesses of solvent of the suspending medium. This methodology employed in the prior art is known to cause disruptions to the monomer-template interactions, thereby deleteriously affecting the recognition abilities of the subsequently created MIPs.

Characteristics of MIPs Created by the Droplet Polymerization Method

The droplet polymerization process described herein produces particles of molecularly imprinted polymers. These initially produced particles ("primary particles") formed by polymerization of droplets are typically spheroidal in shape. Primary particles are not physically associated with other primary particles. The size of primary particles is controlled by a variety of factors, including the diameter of the orifice through which the monomer-template reaction mixture passes, the flow rate of the monomer-template reaction mixture, the physical properties of the monomer-template reaction mixture (e.g., viscosity, surface tension, and temperature), and the physical properties of the suspending medium (e.g., viscosity, surface tension, agitation, and temperature). In general, it is possible to produce spheroidal primary particles from about 1 μm to 1 mm in diameter using the present invention.

Within a given polymerization, whereby conditions are maintained constant throughout, particle size is expected to vary according to an approximately Gaussian distribution. A narrower particle size distribution can be produced, however, if the monomer-template reaction mixture droplets undergo partial polymerization before they enter the suspending medium. Overall narrow particle size distribution for MIPs has several advantages. First, a narrow particle size distribution can provide more uniform packing when the MIPs are used for column adsorption, which leads to more homogeneous flow profile within the column. Secondly, narrow particle size distribution provides better mass transfer properties, minimizing such chromatographic artifacts as peak tailing.

Thus, the process of the present invention will form MIPs wherein at least 60% of the MIP is spheroidal primary particles ranging in size from 1 μm to 1 mm in diameter, more preferably at least about 75% of the MIP is spheroidal primary particles ranging in size from 1 μm to 1 mm in diameter, and most preferably are MIPs wherein at least about 90% of the MIP is spheroidal primary particles ranging in size from 1 μm to 1 mm in diameter.

In a further preferred embodiment, the process of the present invention will form MIPs wherein at least 70% of the MIP is spheroidal primary particles ranging in size from 1 to 600 μm in diameter. More preferably at least about 70% of the MIP is spheroidal primary particles ranging in size from 10 to 400 μm in diameter, and most preferably are MIPs wherein at least about 85% of the MIP is spheroidal primary particles ranging in size from 10 to 400 μm in diameter.

Primary particles may partially or completely aggregate into "macroparticles" made up of two or more primary particles. In some cases, these macroparticles of complex geometry may be desired with maximum size up to about 2.5 cm. These polymer aggregates can be formed generally by increasing the rate that the reaction mixture is added to the suspending medium and/or decreasing the agitation rate of the suspending medium containing the reaction mixture.

Surface area and porosity of the MIP can be modified in at least two ways. First, the Applicants discovered that use of a template molecule typically increases the available surface area of the polymer as compared to a non-imprinted polymer, improving the mass transfer performance of the polymer. Second, the surface area can be increased even further when a porogen is added to the reaction mixture. Of course, an increase in surface area depends on the quantity and type of template and/or porogen. Preferably, MIPs produced using the methodology of the present invention, particularly when made in the presence of a porogen, have a surface area of at least about 150 $m^2/g$ or more (more preferably about 300 $m^2/g$ or more) when measured by nitrogen porosimetry.

Extraction of the Template Molecules from the MIPs

Traditional molecular imprinting methods typically extract template molecules from the newly created MIP by recovering the MIP from the polymerization vessel, transferring the MIP to a second vessel for rinsing and/or drying, and then subsequently extracting the template from the MIP. The extracted MIP is then washed before it may be used to bind analyte. Such steps require solids handling with a possible exposure to fines and inevitably result in some loss of polymer. Although it is possible to extract the template molecules from the MIP created by the present droplet polymerization method using traditional template molecule extraction methods, the instant invention provides additional process efficiencies.

Specifically, template extraction with Applicants' invention can optionally occur in a single vessel and within the same suspending medium in which polymerization occurred. Thus, extraction may occur prior to MIP recovery. By judiciously choosing a suspending medium with an affinity for the template, template extraction can occur passively, simply by maintaining the MIP within the suspending medium (under elevated temperature, if desired) for a period of time after polymerization is completed (typically about 1–4 hours). The extraction process can generally be measured by HPLC or any other analytical technique known to those in the art and appropriate for the template molecules of interest.

Further, it is possible to isolate and purify these extracted template molecules from the suspending medium for repeated use in subsequent imprinting. Recycling is an especially useful strategy when template molecules are prohibitively expensive if used only one time. One skilled in the art will recognize that numerous separation technologies exist to purify the template, which can then be reused for further imprinting. For example, distillation can be used to effect a separation based on a difference in volatilities between template and remaining compounds. Alternatively, a chromatographic process may be used to separate template based on judicious selection of chromatographic conditions (e.g., mobile and stationary phases).

DESCRIPTION OF THE PREFERED EMBODIMENTS

Although applicable to many industrial processes, Applicants' method is particularly useful to separate and recover isoflavones.

Isoflavones

In the last decade, high interest in the phytoestrogens (i.e. plant hormones) has developed, and more specifically, in the phytoestrogen class of compounds known as isoflavones. This class of compounds is general described as those compounds which are derived from isoflavone (CAS number 574-12-9; Formula I, below),

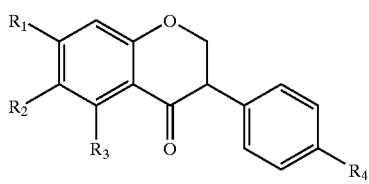

Formula I where $R_1$, $R_2$, $R_3$ and $R_4$=H. Other isoflavones within this broad class of compounds may have various combinations of —H, —OH, —OCH$_3$, -carbohydrates (e.g., glucose), -modified carbohydrates, etc. as $R_1$, $R_2$, $R_3$ and/or $R_4$.

In addition to the estrogenic activity of isoflavones, these phenolic compounds possess a myriad of biological properties implicated as responsible for several health benefits in humans. For example, it has been suggested that isoflavones may be effective to prevent or retard certain cancers such as prostate cancer and breast cancer [Peterson and Barnes, Biochem. and Biophysical Res., Communications, 179(1): 661–67 (Aug. 30, 1991); Peterson and Barnes, The Prostate, 22:335–45 (1993); Barnes et al., Mutagens and Carcinogens in the Diet, pp. 239–53 (1990); and Herman et al., First International Symposium on the Role of Soy in Preventing and Treating Chronic Disease, pp. 757S–770S (Feb. 20–23, 1994)]. Additionally, isoflavones are also believed to reduce or prevent menopausal symptoms (Adlercreutz et al., The Lancet, 339:1233 (May 16, 1992)). Furthermore, isoflavones have been identified as vasodilating agents in humans and in non-human primates, with corresponding cardioprotective effects (Honore et al., Circulation, 92:1:349 (1995)).

While isoflavones are widely distributed in the plant kingdom, the concentrations of these compounds are relatively high in legumes—and particularly so, in the soybean (Coward et al., J. Agricultural and Food Chemistry 41: 1961–1967 (1993)). Most soy proteins commonly used by the food industry contain a mixture of isoflavones in varying concentrations (ranging from about 0.1–3.0 mg/g).

The principal isoflavones found in soy proteins and soy foods are daidzein, genistein, and glycitein. Each of these soy isoflavones exist as: 1) isoflavone glucosides (glucones)—those molecules having a glucose molecule attached to the isoflavone moiety ($R_1$=glucose); 2) isoflavone conjugates—those molecules having additional moieties attached to the glucose molecule of an isoflavone glucoside (e.g., 6"-OAc genistin contains an acetate group attached to the six position of the glucose molecule of genistin, while 6"-Omal glycitin contains a malonyl group attached to the six position of the glucose molecule of glycitin) ($R_1$=malonyl or aetyl ester forms of glucate); and 3) aglucone isoflavones, which consist solely of an isoflavone moiety. The aglucone isoflavones are derived from those compounds having Formula I, wherein $R_1$, $R_2$, $R_3$ and $R_4$ may be selected from the group consisting of H, OH and OCH$_3$. Genistein has the formula above where $R_1$=OH, $R_2$=H, $R_3$=OH, and $R_4$=OH; daidzein has the formula above where $R_1$=OH, $R_2$=H, $R_3$=H, and $R_4$=OH; and glycitein has the formula above where $R_1$=OH, $R_2$=OCH$_3$, $R_3$=H, and $R_4$=OH. Thus, soy isoflavones typically consist of the following different isoflavones: genistin, 6"-OAc genistin, 6"-OMal genistin, genistein, daidzin, 6"-OAc daidzin, 6"-OMal daidzin, daidzein, glycitin, 6"-OAc-glycitin, 6"-OMal glycitin, and glycitein. Additionally, biochanin A, formononentin, and coumestrol are also frequently present as soy isoflavones. Together, these compounds are associated with the inherent, bitter flavor of soybeans.

Recent efforts to obtain the medical benefits of isoflavones have focused on separating and recovering the isoflavones from plant materials. The following patents describe various methods of separating isoflavones from plant materials such as Pueraria lobata, legumes, and soy: U.S. Pat. Nos. 4,428,876; 5,702,752; 5,679,806; 4,390,559; 4,366, 248; 4,366,082; 4,264,509; 4,232,122; 4,157,984; Japanese Patent No's. 1-258669A; 5-170756A; 41-90720A; 62-126186A; 62-126185A; and PCT patent application No. WO 93/23069. The separated isoflavone materials may be utilized in various pharmaceutical or dietary supplement compositions and are described in abundant patent literature.

In light of the known benefits of isoflavones, an objective of the present invention is to develop a more efficient and cost effective extraction method for resolution and separation of these compounds.

Soybean Whey

Soy materials from which soy isoflavone compounds can be isolated include: soy beans, dehulled soy beans, soy meal, soy flour, soy grits, soy flakes (full fat and defatted), soy cotyldeons, soy molasses, soy protein concentrate, soy whey, soy whey protein, and soy protein isolate. While soy whey and soy molasses are aqueous, the remaining soy materials are generally solids and not immediately amenable for adsorptive separation of isoflavones. Those skilled in the art will recognize various extraction techniques suitable to extract isoflavones into a liquid, such that the isoflavones could then be concentrated via adsorption.

Soy whey is generally produced from soybean flakes, from which the oil has been removed by solvent extraction. The flakes are extracted with an aqueous extractant, to produce a protein extract in which the desired isoflavone compounds are typically solubilized. The protein material is then precipitated as a curd, and separated from the aqueous extract. The remaining aqueous extract of the starting material is referred to as the "whey". The isoflavones for the most part remain solubilized in the whey. Details concerning this preparation are exemplified in U.S. Pat. No. 5,637,561.

Although the present invention is exemplified with respect to soybean whey and although the process is particularly suited for the recovery and separation of soy isoflavones from soy whey, the process is generally applicable to the recovery and separation of isoflavones from a variety of crop sources that contain isoflavones.

Design of a Template Molecule for Soy Isoflavones

Any of following isoflavones could be used as the template molecule for molecular imprinting to achieve resolution and separation of a specific soy isoflavone: genistin, 6"-OAc genistin, 6"-OMal genistin, genistein, daidzin, 6"-OAc daidzin, 6"-OMal daidzin, daidzein, glycitin, 6"-OAc-glycitin, 6"-OMal glycitin, and glycitein. However, it was desirable to seek a molecule that was a structural analog to these isoflavones, to enable multiple isoflavones to be isolated using a single "generic" MIP. Additionally, this would avoid the need for using purified soy isoflavones as the template for molecular imprinting (at a significant cost savings). To this end, the Applicants suspected that a suitable structural analog for the broad class of soy isoflavones would be derived from an estradiol-related compound, since isoflavones possess estrogenic activity.

Estradiol benzoate ($C_{25}H_{28}O_3$; Formula II) and isoflavones are both

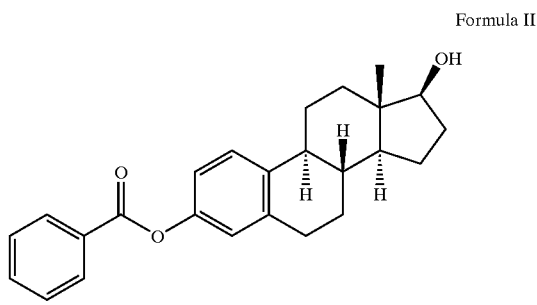

Formula II known to interact with the estrogen receptor (Bolaos-Garca et al. "Structure Of 17-(-Estradiol Benzoate And Its Interaction With Taf-2 Domain Of Estrogen Receptor (Er) By Modeling". XVII Congress and General Assembly of the International Union of Crystallography, August 8-17, 1996; Seattle, Wash.). Additionally, estradiol benzoate is similar structurally to the isoflavones contained in the soy whey. This determination was made based on structural comparison and calculations of molecular volume, molecular dimensions, and projected area.

Specifically, total volume inside the van der Waals' surface for estradiol benzoate was calculated to be 343.5 cubic Angstroms, while that for genistin was calculated to be 354.7 cubic Angstroms. Molecular "size" was determined for each molecule by aligning the x, y, and z axes with the molecule's principal axes of rotation. Then, the minimum and maximum values of x, y, and z within the van der Waals' surface were determined, followed by calculation of the difference of ($x_{max}-x_{min}$), etc., to give a sense of the length, width and breadth of the molecule in Angstroms. The following estimates were made for estradiol benzoate and genistin:

Table 1
Comparison of Molecular "Size" for Estradiol Benzoate and Genistin

TABLE 1

Comparison of Molecular "Size" for Estradiol Benzoate and Genistin

| Template | Length (Å) | Width (Å) | Depth (Å) |
|---|---|---|---|
| Estradiol benzoate | 19.24 | 8.32 | 6.17 |
| Genistin | 19.40 | 8.76 | 6.77 |

Finally, projected area—defined as the area (in square Angstroms) projected by the molecule in the plane defined by the central bicyclic group—was calculated for estradiol benzoate (105.5 square Angstroms) and genistin (85.6 square Angstroms). This calculation showed a minor discrepancy between the two putative template molecules, since the glucose group in genistin is highly twisted with respect to the rest of the molecule, while estradiol benzoate is much more planar. Despite this difference in projected area, estradiol benzoate was considered a viable template molecule overall for forming MIPs in the present invention. These MIPs could then be applied to extract the more valuable isoflavones from soy whey.

Additionally, it was expected that phenol would be a suitable template molecule for a MIP designed to bind isoflavones. Although using phenol may be less desirable than estradiol benzoate, phenol does share a common structural motif with the isoflavones.

A variety of other isoflavones or structural analogs could be chosen as a template molecule for the imprinting methods of the present invention. It is also readily apparent to those skilled in the art that analogous strategies to select templates could used to imprint for analytes other than isoflavones.

In the present invention, a small-scale polymerization apparatus was assembled consisting of a syringe pump connected to a transfer line that feeds into a resin kettle. The resin kettle is equipped with an inlet for a nitrogen feed through a water-cooled condenser, a mechanically or electrically driven agitator, and a heating mantle for temperature control of the resin kettle contents. The transfer line ends several centimeters above the suspending medium, allowing droplets to fall a short distance before entering the suspending medium. This particular configuration is not meant to limit the scope of the invention, as numerous modifications could be made without departing from the spirit of the invention.

MIPs formed using the droplet polymerization method were initially evaluated for viability of the polymerization apparatus and MIP particle characteristics. MIPs formed using estradiol benzoate (EB) as the template and a "non-imprinted control" both were white in color, possessed spheroidal morphology (with a median particle diameter of ~100 μm), and had a surface area of within the range of about 100 to 250 $m^2/g$. These particles were then subjected to comparative batch equilibrium adsorption and column adsorption experiments using soy whey, to determine if the EB-imprinted polymer was able to selectively adsorb soy isoflavones. Results demonstrated superior binding (400%) of isoflavones to the EB-imprinted polymer relative to a MIP produced using conventional suspension methods. The non-imprinted control performed significantly worse as compared to either imprinted polymer.

Subsequent experimentation broadly evaluated various parameters affecting the MIP formed. Specifically, three different template molecules were utilized for imprinting (daidzin, phenol, estradiol benzoate, or a combination of estradiol benzoate and phenol); two different MIPs were formed utilizing only crosslinking monomers in the absence of any functional monomers; and alterations were made to the suspending medium in terms of the rate of agitation, the volume of the media, and its composition. All MIPs tested were able to selectively bind isoflavones according to analysis using batch equilibrium adsorption.

A more detailed study was made concerning the surface area characteristics of the MIPs formed, using the present droplet polymerization method. In four different experiments, it was discovered that the use of a template significantly increases (by greater than 400%) the surface area of the polymer, as compared to a polymer made without template. Porogens were also beneficial to increase the surface area of the MIP, thereby resulting in higher loading of isoflavone analytes. This increase in surface area was found to dramatically increase MIP adsorption, relative to adsorption by a non-imprinted control polymer that possessed a reduced surface area.

Finally, a detailed protocol was developed that would be suitable for recycling the template molecule, following its extraction from the MIP. This enables reuse of the template in future molecular imprinting applications, thereby lowering expenditures for template molecules and increasing the utility of the invention. Also, an additional protocol is provided for forming the MIP and extracting the template in the same vessel. This prevents the need for transferring the polymer to another vessel prior to extraction, thus increasing overall process efficiency substantially.

Thus, the present droplet polymerization method is applicable for molecular imprinting with a wide range of templates, to produce MIPs that have superior adsorption capabilities compared to those MIPs known in the art today. The present methodology is well suited for numerous applications, as a variety of parameters can be readily altered to achieve specific desirable characteristics in the MIP formed. These include variation in the size of particles, the template(s) utilized, the surface area of the MIP, and the overall composition of the MIP—as determined by the specific monomers, application of porogens/solvents, and initiators. Further, the droplet polymerization method disclosed may provide many process efficiencies which are not possible when following methods in the prior art, as template (and optionally, porogen) extraction may occur in the same vessel and with the same suspending medium used for MIP polymerization, before MIP recovery.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions.

The meaning of abbreviations is as follows: "hr" means hour, "min" means minute, "sec" means second, "d" means day, "mL" means milliliters, "L" means liters, "g" means grams, "m" means meters, "nm" means nanometers, "ppm" means parts per million, "MW" means molecular weight, and "rpm" means revolutions per min.

General Methods

For the text which follows, the following compounds and abbreviations are used:

As monomers (functional and crosslinking): methacrylic acid (MAA) at 99% purity, Aldrich (St. Louis, Mo.); styrene at 99+% purity, Aldrich; divinylbenzene (DVB) at 80% purity, Aldrich; 4-vinylpyridine (VP) at 95% purity, Aldrich; ethylene glycol dimethacrylate (EGDMA) at 98% purity, Aldrich;

As template: estradiol benzoate (EB) at 98% purity, Sigma (St. Louis, Mo.);

As additives to the suspending medium: polyvinylalcohol (PVA) at 98% purity, 77,000 MW, Aldrich; hydroxyethylcellulose (HEC) of unknown purity, 1,300,000 MW, Aldrich; polyvinylpyrolidone (PVP) of unknown purity, 360,000 MW, Aldrich; cyclohexanol at 99% purity, Aldrich; dodecylalcohol at 99% purity, Kodak (Rochester, N.Y.);

As initiators: azo free radical initiators such as VAZO-52® (2'-Azodi(2,4-Dimethylvaleronitrile)) and VAZO-67® (2,2'-Azodi(2-Methylbutyronitrile)), of unknown purity, E. I. du Pont de Nemours and Company (Wilmington, Del.).

Unless specified, each of the above compounds was used without further purification. Soy whey was obtained from DuPont Protein Technologies (St. Louis, Mo.).

Molecularly Imprinted PolVmer Polymerization Setup

The polymerization apparatus used for all droplet polymerizations consisted of a syringe pump connected to a heat-traced stainless steel transfer line that feeds into a resin kettle. The transfer line ended several centimeters (typically 2.5 cm) above the suspending medium. The resin kettle was equipped with an inlet for a nitrogen feed through a water-cooled condenser, a mechanically- or electrically-driven agitator, and a heating mantle for temperature control of the resin kettle contents. Those skilled in the art will recognize that the configuration and type of equipment can be readily altered without departing from the spirit of the invention.

Batch Equilibrium Adsorption Experiments

The batch equilibrium adsorption experiments were performed by contacting a known mass of the molecularly imprinted polymer (typically 0.2–5 g) with a known volume of soy whey (typically 20 mL) obtained from DuPont Protein Technologies (St. Louis, Mo.). Samples were placed on a rotary shaker (typically set at 100 rpm) and shaken at room temperature for 4–24 hr. A portion of the supernatant (typically 1 mL) was withdrawn for HPLC analysis and was quantified by the difference in the concentration in the soy whey before and after the experiment. Equilibrium was determined to have been reached when no change of concentration in the supernatant was observed with time.

HPLC Quantitation of Components

An HPLC was equipped with a Hypersil ODS column (5 micron stationary phase), with column dimensions of 200 mm×2.1 mm. UV detection was at 260 nm. Mobile phase A consisted of 88:10:2 (volume ratio) of water:methanol:glacial acetic acid and mobile phase B consisted of 82:2 methanol:acetic acid. Pump gradient conditions used 0.4 mL/min throughout, with 95% A at t=0 min, 30% A at t=1 min, 0% A at t=32 min, 95% A at t=39 min, and remaining A until the end of the run at 55 min. Other details of the HPLC procedure are familiar to those skilled in the art.

Adsorption Measurement

For isoflavone adsorption (e.g., from soy whey), the adsorption data was converted to an aglycone-basis. Using analytical quantitation to identify the mass adsorption of the six isoflavones (three isoflavone glucosides: daidzin, genistin, glycitin; and three isoflavone aglycones: daidzein, genistein, glycitein), the aglycone-basis was calculated by the following:

aglycone mass adsorbed=mass daidzein adsorbed+mass genistein adsorbed+mass glycitein adsorbed+[mass daidzin adsorbed*(MW daidzein/MW daidzin)]+[mass genistin adsorbed*(MW genistein/MW genistin)]+[mass glycitin adsorbed*(MW glycitein/MW glycitin)].

The isoflavone loading (mass isoflavone adsorbed/mass polymer) can then be calculated by dividing the aglycone mass adsorbed by the mass of polymer used in the adsorption experiment. Measurement of $K_m$ was calculated by a best fit of the adsorption data to the Langmuir equation.

Nitrogen Porosimetry

Pore distributions are calculated from the desorption branch of the nitrogen isotherm using the BJH method (Barret, Joyner, and Halenda, *J. Am. Chem. Soc.* 73, 373 (1951)). The "surface area" referred to herein is the surface area measured by this method.

Median Particle Size Measurement via Laser Diffraction

The median particle size was measured with a Microtrac Full-Range Analyzer (FRA), which is based on the Fraunhofer scattering model of light interacting with particles of various sizes. Particles were dispersed in water (at about a 1% volume concentration) before they were loaded into the FRA recirculation cell. The reported median diameter by this method gives a diameter for an equivalent volume sphere.

Example 1

Polymerization Using the Droplet Polymerization Method

Example 1 demonstrates the droplet polymerization method for the preparation of one MIP and one "non-imprinted control" polymer. The MIP is prepared using estradiol benzoate (EB) as a template; the "non-imprinted control" polymer was made in an identical manner, but without a template molecule. Both polymers were extracted following polymerization and used in subsequent batch and column adsorption experiments (see Examples 2 and 3).

MIP with Estradiol Benzoate (EB) as Template

To a 500 mL glass resin keftle (equipped with water-driven condenser, air-driven agitator with Teflon® paddle, $N_2$ sweep, and heating mantle) 100 mL water with 1.2 g polyvinylpyrolidone was charged. This suspending medium was heated to approximately 90° C. and agitation of 700 rpm was then achieved. A pre-heated glass syringe was used to dropwise add a previously mixed reaction mixture of 0.82 g MAA, 0.99 g styrene, 18.2 g EGDMA, 1.78 g EB, 0.16 g VAZO-67®, 18.71 g cyclohexanol, and 1.96 g dodecylalcohol to the water by gravity feed. Dropwise addition of the monomer-template reaction mixture was complete in 35 min. Polymerization was complete 20 min thereafter, and the polymer beads were recovered via Buchner filtration.

Soxhlet extraction (chloroform under full reflux for 4 hrs) was used to remove the template from the polymer. Extracted MIP particles were white in color, possessed a median particle diameter of 97 microns as measured by laser diffraction, and had 248 $m^2/g$ surface area as measured by nitrogen porosimetry.

"Non-imprinted Control"

The non-imprinted control polymer was prepared in a manner identical to the polymer above, however no template was included in the reaction mixture. Extracted non-imprinted control particles were white in color, possess a median particle diameter of about 100 microns as measured by laser diffraction, and have a surface area of equal to or less than about 150 $m^2/g$ as measured by nitrogen porosimetry.

Example 2

Comparative Batch Equilibrium Absorption of Soy Whey by the EB-imprinted MIP and the Non-imprinted Control The polymers from Example 1 were used in a batch equilibrium adsorption experiment. An analogous imprinted polymer (identical template:monomer:crosslinker ratio and other analogous properties) prepared via conventional suspension polymerization was also used. In this context, conventional suspension polymerization was done by adding all ingredients instantaneously to the reaction mixture before heating was begun.

The batch equilibrium adsorption experiment, HPLC analysis, and determination of adsorption measurements were conducted according to the methodology of the General Methods. The results for isoflavone uptake are shown in Table 2 for soy whey, using the EB-imprinted MIP, the analogous MIP formed via conventional polymerization, and the non-imprinted control.

TABLE 2

Loading and Km for various polymers in soy whey

| Polymer | Maximum loading (mg/g) | Km (mg/L) |
| --- | --- | --- |
| EB-Imprinted MIP | 19 | 3 |
| Non-imprinted Control | 2 | 10 |
| Conventional suspension-imprinted polymer | 5 | 3 |

These results demonstrate that the methodology of the present invention using the droplet polymerization method is sufficient to allow polymers to bind isoflavones with high selectivity. A non-imprinted control polymer prepared using the drip polymerized aspect of this invention demonstrated that adsorption performance was significantly diminished due to the lack of template and specific imprinting. Further, the present method was superior to those MIPs formed using conventional suspension methods, as maximum loading of isoflavones was approximately four times greater than that for the conventionally formed MIP. It is hypothesized that this advantage in loading is the result of improved monomer-template interactions and rapid polymerization, as previously described.

Example 3

Column Adsorption of Soy Whey by the EB-imprinted MIP

The EB-imprinted MIP from Example 1 was also tested for use in a column adsorption experiment. Again, the MIP performed with high selectivity, enabling recovery of isoflavones from soy whey.

The column adsorption experiment was conducted as follows. A glass column (Amicon, 1 inch ID, 15 inch maximum usable length) was fitted with adjustable headers and slurry packed with a mixture of the EB imprinted MIP (7.95 g, from Example 1) and water. After the headers were tightened, settling was allowed to occur via vibration or flow of water through the column, and the headers were retightened. Soy whey (3.89 L, containing approximately 2.5% dissolved solids) was first filtered using a 10,000 MW cut-off hollow fiber membrane. The soy whey was then pumped through the packed column at an average rate of 5.5 mL/min/min. After a prescribed period of time (typically 2–8 hr), the feed to the column was switched to water to rinse the column (3 L of distilled water at an average rate of 6 mL/min). The feed was then switched to eluent (525 mL of 1 N NaOH, at an average rate of 8.5 mL/min) in order to displace the adsorbed components off the polymer. During the column experiment, samples of the material exiting the column were taken for HPLC analysis (according to the methodology of the General Methods).

The maximum isoflavone concentration factor obtained was 67.99 (where concentration factor=concentration in eluent/concentration in feed). The observed dynamic capacity was 5.6 mg isoflavones (aglycone basis)/g polymer.

These results demonstrated that MIPs formed using droplet polymerization are suitable for column adsorption experiments and that this MIP was able to concentrate isoflavones on a preparative scale. In other words, it is expected that MIPs prepared in this manner would be suitable for the concentration and purification of isoflavones for manufacturing rather than analytical applications (which typically utilize HPLC merely to identify compounds).

Example 4

Use of Various Templates for Molecular Imprinting with the Droplet Polymerization Method Following initial experimentation which proved the viability of the droplet polymerization method for the purpose of selectively recovering isoflavones from soy whey (Examples 1–3), a variety of other template molecules were used for production of MIPs. Specifically, MIPs were created using daidzin, phenol, and a combination of estradiol benzoate and phenol. The daidzin- and phenol-imprinted MIPs were each used successfully for isolation of daidzin and soy isoflavones, respectively.

The results show that a variety of templates can be used successfully to create MIPs with good loading and selectivity. Further, templates similar to the target molecule (i.e., structural analogs) can also be used if desired, whether for cost reasons, experimental simplicity, etc.

Imprinting with Daidzin as Template

To a 500 mL glass resin kettle (equipped with water-driven condenser, electric driven agitator with Teflon® paddle, $N_2$ sweep, and heating mantle) 600 mL water with 3.6 g polyvinylpyrolidone was charged. This suspending medium was heated to >90° C. and agitation of 300 rpm was then achieved. A syringe pump (Harvard Apparatus Pump 44) was used to dropwise add a previously mixed reaction mixture of 0.82 g MAA, 0.99 g styrene, 1 g daidzin, 0.16 g VAZO-67®, 18.2 g EGDMA, 18.71 g cyclohexanol, and 1.96 g dodecylalcohol to the resin kettle. Dropwise addition of the monomer-template reaction mixture was complete in 45 min. Polymerization was complete 30 min thereafter, and the polymer beads were recovered via Buchner filtration.

To remove the template, Soxhlet extraction was done using chloroform under full reflux for 4 hours. MIP particles were white in color, had a median particle diameter of 160 microns as measured by laser diffraction, and had 221 $m^2/g$ surface area as measured by nitrogen porosimetry.

Batch equilibrium adsorption in soy whey, as described in the General Methods, gave a linear isotherm with loading of 3.5 ppm isoflavones at a concentration of 5 ppm in the whey.

Imprinting with Phenol as Template

To a 500 mL glass resin kettle (equipped with water-driven condenser, electric driven agitator with Teflon® paddle, $N_2$ sweep, and heating mantle) 400 mL water with 2.4 g polyvinylpyrolidone was charged. This suspending medium was heated to >90° C. and agitation of 300 rpm was then achieved. A syringe pump (Harvard Apparatus Pump 44) was used to dropwise add a previously mixed reaction mixture of 0.16 g VAZO-52®, 0.45 g phenol, 0.90 g ethanol, 0.99 g styrene, 0.82 g MAA, 18.20 g EGDMA, 18.71 g cyclohexanol, and 1.96 g dodecylalcohol to the resin kettle. Dropwise addition was done at 40 mL/hr, with the transfer line temperature set at 40° C. The experiment was halted 30 min after addition was complete, and the polymer beads were recovered via Buchner filtration.

Soxhlet extraction of template proceeded by extraction with chloroform under full reflux for 4 hrs. Polymer particles were white in color and appeared approximately uniform by eye.

Batch equilibrium adsorption in soy whey, as described in the General Methods, gave a maximum loading of 3 ppm isoflavones.

Imprinting with Estradiol Benzoate and Phenol as Templates

To a 500 mL glass resin kettle (equipped with water-driven condenser, electric driven agitator with Teflon® paddle, $N_2$ sweep, and heating mantle) 400 mL water with 2.4 g polyvinylpyrolidone was charged. This suspending medium was heated to >90° C. and agitation of 300 rpm was then achieved. A syringe pump (Harvard Apparatus Pump 44) was used to dropwise add a previously mixed reaction mixture of 0.16 g VAZO-52®, 0.89 g EB, 0.22 g phenol, 2.02 g ethanol, 0.82 g MAA, 0.99 g styrene, 18.2 g EGDMA, 18.71 g cyclohexanol, and 1.96 g dodecylalcohol to the resin kettle. Dropwise addition was done at 40 mL/hr, with the transfer line temperature set at 40° C. The experiment was halted 30 min after addition was complete, and the polymer beads were recovered via Buchner filtration.

Particles were white in color, and judged to be uniform by eye. This MIP is expected to select a suite of isoflavones from soy whey or other samples with high specificity. It is expected that any combination of templates could be successfully employed to form an MIP using the present methodology.

Example 5

Use of Crosslinking Monomers without Functional Monomers for Molecular Imprinting with the Droplet Polymerization Method Following initial experimentation which proved the viability of the droplet polymerization method for the purpose of selectively recovering isoflavones from soy whey (Examples 1–3), some effort was made to examine various monomer components for creation of the MIPs. Specifically, MIPs were created using: 1) DVB as the sole monomer; and 2) EGDMA as the sole monomer. Whereas both DVB and EGMDA have two vinyl groups, DVB is an aromatic crosslinking monomer and EGDMA is an aliphatic crosslinking monomer.

DVB as Crosslinking Monomer

To a 500 mL glass resin kettle (equipped with water-driven condenser, electric driven agitator with Teflon® paddle, $N_2$ sweep, and heating mantle) 600 mL water with 3.6 g polyvinylpyrolidone was charged. This suspending medium was heated to >90° C. and agitation of 300 rpm was then achieved. A syringe pump (Harvard Apparatus Pump 44) was used to dropwise add a previously mixed reaction mixture of 2.89 g EB, 20 g DVB, 0.16 g VAZO-67®, 18.71 g cyclohexanol, and 1.96 g dodecylalcohol to the resin kettle. Dropwise addition of the monomer-template reaction mixture was complete in 30 min. Polymerization was complete 30 min thereafter, and the polymer beads were recovered via Buchner filtration.

To remove the template, Soxhlet extraction was done using chloroform at full reflux for 4 hours. MIP particles were white in color, had a median particle diameter of 129 microns as measured by laser diffraction, and had 529 $m^2/g$ surface area as measured by nitrogen porosimetry.

Batch equilibrium adsorption of soy whey with this MIP, as described in the General Methods, gave a 1.1 ppm maximum loading of isoflavones versus a 0.4 ppm maximum loading for the non-imprinted control polymer, which was prepared identically except for the presence of template.

EGDMA as Crosslinking Monomer

To a 500 mL glass resin kettle (equipped with water-driven condenser, electric driven agitator with Teflon® paddle, $N_2$ sweep, and heating mantle) 600 mL water with 3.6 g polyvinylpyrolidone was charged. This suspending medium was heated to >90° C. and agitation of 300 rpm was then achieved. A syringe pump (Harvard Apparatus Pump 44) was used to dropwise add a previously mixed reaction mixture of 0.16 g VAZO-67®, 1.96 g EB, 3.92 g ethanol, 20 g EGDMA, 18.71 g cyclohexanol, and 1.96 g dodecylalcohol to the resin kettle. The experiment was halted 30 min after addition was complete, and the polymer beads were recovered via Buchner filtration.

To remove the template, Soxhlet extraction was performed using chloroform under full reflux for 4 hours.

Batch equilibrium adsorption in soy whey, as described in the General Methods, gave a maximum loading of 20 ppm isoflavones versus the 1.1 ppm maximum loading for the DVB MIP in this example. Thus, for the adsorption of isoflavones from soy whey under the conditions of this example, clearly EGDMA is preferred over DVB as the sole monomer.

As a general observation, the use of crosslinking monomers alone gave superior results to those MIPs prepared using a combination of functional and crosslinking monomers in the present work.

Example 6

Use of Modified Suspending Media for Molecular Imprinting with the Droplet Polymerization Method Following initial experimentation which proved the viability of the droplet polymerization method for the purpose of selectively recovering isoflavones from soy whey (Examples 1–3), some effort was made to optimize the suspending medium utilized for production of MIPs. Specifically, MIPs were created using: 1) variable quantities of suspending medium and amount of agitation; 2) 20% by volume ethylene glycol in the suspending medium; 3) hydroxyethylcellulose in the suspending medium; and 4) polyvinylalcohol in the suspending medium.

Increased Amount and Agitation of the Suspending Medium

To a 500 mL glass resin kettle (equipped with water-driven condenser, electric driven agitator with Teflon® paddle, $N_2$ sweep, and heating mantle) 600 mL water with 3.6 g polyvinylpyrolidone was charged. This suspending medium was heated to >90° C. and agitation of 300 rpm was then achieved. A syringe pump (Harvard Apparatus Pump 44) was used to dropwise add a previously mixed reaction mixture of 0.82 g MAA, 0.99 g styrene, 1 g EB, 0.16 g VAZO-67®, 18.2 g EGDMA, 18.71 g cyclohexanol, and 1.96 g dodecylalcohol to the resin kettle. Dropwise addition of the monomer-template reaction mixture was complete in 45 min. Polymerization was complete 30 min thereafter, and the polymer beads were recovered via Buchner filtration.

MIP particles were white in color, had a median particle diameter of 417 microns as measured by laser diffraction, and had 311 $m^2/g$ surface area as measured by nitrogen porosimetry.

Use of 20% Ethylene Glycol in the Suspending Media

To a 500 mL glass resin kettle (equipped with water-driven condenser, electric driven agitator with Teflon® paddle, $N_2$ sweep, and heating mantle) 320 mL water, 80 mL ethylene glycol, with 2.4 g polyvinylpyrolidone was charged. This suspending medium was heated to >90° C. and agitation of 300 rpm was then achieved. A syringe pump (Harvard Apparatus Pump 44) was used to dropwise add a previously mixed reaction mixture of 0.16 g VAZO-52®, 1.78 g EB, 3.56 g ethanol, 0.99 g styrene, 0.82 g MAA, 18.20 g EGDMA, 18.71 g cyclohexanol, and 1.96 g dodecylalcohol to the resin kettle. Dropwise addition was done at 50 mL/hr, with the transfer line temperature set at 40° C. The experiment was halted 30 min after addition was complete, and the polymer beads were recovered via Buchner filtration.

Use of Hydroxyethylcellulose (HEC) in the Suspending Medium

To a 500 mL glass resin kettle (equipped with water-driven condenser, electric driven agitator with Teflon®) paddle, $N_2$ sweep, and heating mantle) 400 mL water with 1.2 g hydroxyethylcellulose was charged. This suspending medium was heated to >90° C. and agitation of 300 rpm was then achieved. A syringe pump (Harvard Apparatus Pump 44) was used to dropwise add a previously mixed reaction mixture of 0.16 g VAZO-52®, 1.78 g EB, 3.56 g ethanol, 0.82 g MAA, 0.99 g styrene, 18.2 g EGDMA, 18.71 g cyclohexanol, and 1.96 g dodecylalcohol to the resin kettle. Dropwise addition was done at 50 mL/hr, with the transfer line temperature set at 40° C. The experiment was halted 30 min after addition was completed, and the polymer beads were recovered via Buchner filtration.

Use of Polyvinylalcohol (PVA) in the Suspending Medium

To a 500 mL glass resin kettle (equipped with water-driven condenser, electric driven agitator with Teflon® paddle, $N_2$ sweep, and heating mantle), 400 mL water with 2.8 g polyvinylalcohol was charged. This suspending medium was heated to >90° C. and agitation of 300 rpm was then achieved. A syringe pump (Harvard Apparatus Pump 44) was used to dropwise add a previously mixed reaction mixture of 0.16 g VAZO-52®, 1.78 g EB, 3.56 g ethanol, 0.82 g MAA, 0.99 g styrene, 18.2 g EGDMA, 18.71 g cyclohexanol, and 1.96 g dodecylalcohol to the resin kettle. Dropwise addition was done at 60 mL/hr, with the transfer line temperature set at 40° C. The experiment was halted 30 min after addition was complete, and the polymer beads were recovered via Buchner filtration.

Comparison of MIPs Synthesized with Ethylene Glycol, HEC, and PVA in the Suspending Medium For the MIPs produced in the present Example, wherein the suspending medium was water comprising either ethylene glycol, HEC, or PVA, those MIPs formed in the suspending medium with HEC were preferred. This preference for HEC (as opposed to ethylene glycol or PVA) was a result of HEC-created polymer particles which filtered more easily and which did not clump together on the agitator shaft of the vessel. Similar positive results, comparable to those produced using HEC in the suspending medium, were obtained using a suspending medium comprising water and polyvinylpyrrolidone.

These MIP syntheses described in this example show that a number of rheological control agents can be used to alter the polymerization conditions. Those skilled in the art will recognize that the choice of rheological agents is not limited to those described in this example, and that these agents will alter particle properties such as particle size, ability to be filtered readily, and surface area.

Example 7

Altering the Surface Area Characteristics of the MIPS formed Using the Droplet Polymerization Method Following initial experimentation which proved the viability of the droplet polymerization method for the purpose of selectively recovering isoflavones from soy whey (Examples 1–3), some effort was made to study how the surface characteristics of the MIPs could be altered. In the present example, the surface properties were modified in two manners: 1) by using the template to increase the surface area of the MIP as compared to polymer formed without template; and 2) by using a porogen.

Use of Template to Increase Surface Area of MIP

A series of eight polymers were created, comprising four different MIPs and their respective non-imprinted control polymers. "Non-imprinted controls" were prepared identically to the respective imprinted polymer, except without the use of template. Detailed descriptions of the methods for synthesis of each imprinted polymer is listed below.

Polymer 1: To a 500 mL glass resin kettle (equipped with water-driven condenser, electric driven agitator with Teflon® paddle, $N_2$ sweep, and heating mantle) 400 mL water, with 2.4 g polyvinylpyrolidone was charged. This suspending medium was heated to >90° C. and agitation of 300 rpm was then achieved. A syringe pump (Harvard Apparatus Pump 44) was used to dropwise add a previously mixed reaction mixture of 0.16 g VAZO-52®, 1.78 g EB, 3.56 g ethanol, 0.99 g styrene, 0.82 g MAA, 18.20 g EGDMA, 18.71 g cyclohexanol, and 1.96 g dodecylalcohol to the resin kettle. Dropwise addition was done at 40 mL/hr, with the transfer line temperature set at 40° C. The experiment was halted 105 min after addition began, and the polymer beads were recovered via Buchner filtration.

Polymer 2: To a 500 mL glass resin kettle (equipped with water-driven condenser, electric driven agitator with Teflon® paddle, $N_2$ sweep, and heating mantle) 400 mL water, with 2.4 g polyvinylpyrolidone was charged. This suspending medium was heated to >90° C. and agitation of 300 rpm was then achieved. A syringe pump (Harvard Apparatus Pump 44) was used to dropwise add a previously mixed reaction mixture of 0.16 g VAZO-67®, 1.96 g EB, 3.92 g ethanol, 20.0 g EGDMA, 18.71 g cyclohexanol, and 1.96 g dodecylalcohol to the resin kettle. Dropwise addition was done at 40 mL/hr, with the transfer line temperature set at 40° C. The experiment was halted 105 min after addition began, and the polymer beads were recovered via Buchner filtration.

Polymer 3: To a 500 mL glass resin kettle (equipped with water-driven condenser, electric driven agitator with Teflon® paddle, $N_2$ sweep, and heating mantle) 600 mL water, with 3.6 g polyvinylpyrolidone was charged. This suspending medium was heated to >90° C. and agitation of 300 rpm was then achieved. A syringe pump (Harvard Apparatus Pump 44) was used to dropwise add a previously mixed reaction mixture of 0.16 g VAZO-67®, 1.00 g EB, 3.92 g ethanol, 0.82 g MAA, 0.99 g styrene, 18.2 g EGDMA, 18.71 g cyclohexanol, and 1.96 g dodecylalcohol to the resin kettle. Dropwise addition was done at 40 mL/hr, with the transfer line temperature set at 40° C. The experiment was halted 105 min after addition began, and the polymer beads were recovered via Buchner filtration.

Polymer 4: To a 500 mL glass resin kettle (equipped with water-driven condenser, electric driven agitator with Teflon® paddle, $N_2$ sweep, and heating mantle) 600 mL water, with 3.6 g polyvinylpyrolidone was charged. This suspending medium was heated to >90° C. and agitation of 300 rpm was then achieved. A syringe pump (Harvard Apparatus Pump 44) was used to dropwise add a previously mixed reaction mixture of 0.16 g VAZO-67®, 2.89 g EB, 20.0 g DVB, 18.71 g cyclohexanol, and 1.96 g dodecylalcohol to the resin kettle. Dropwise addition was done at 40 mL/hr, with the transfer line temperature set at 40° C. The experiment was halted 105 min after addition began, and the polymer beads were recovered via Buchner filtration.

Following filtration of each of the four MIPs and their respective "non-imprinted control" polymers, Soxhlet extraction was performed using chloroform at full reflux for approximately four hrs.

Table 3 below compares the surface area of each MIP to its "non-imprinted control" polymer.

TABLE 3

Effect of Template on MIP Surface Area

| Composition | Surface area MIP ($m^2/g$) with template | Surface area control ($m^2/g$) without template | % increase in surface area due to presence of template |
| --- | --- | --- | --- |
| Polymer 1 | 220 | 50 | 440 |
| Polymer 2 | 309 | 59 | 520 |
| Polymer 3 | 284 | 37 | 760 |
| Polymer 4 | 529 | 127 | 410 |

These results demonstrate a significant increase in polymer surface area when template is incorporated into the MIP, as compared to the non-imprinted control polymers (made without template). These results were observed over a variety of synthesis conditions and polymer formulations, and thus this behavior appears to be a general phenomenon.

The results suggest that an increase in the amount of template utilized should increase the MIP surface area due to the increased number of molecular voids created. As the template concentration is increased, this creation of surface area would be expected to eventually be limited by other phenomena, such as template self-association or macroscopic clumping of the template. This behavior would also depend on the specific template molecule(s) considered.

Polymerization in the Presence of Porogen

Two MIPs were created, as described below, "with" and "without" porogen incorporated into the monomer-template reaction mixture. The porogen used was a combination of cyclohexanol and dodecylalcohol. In both cases, a small quanity of ethanol was used to assist with solubilization. Following batch equilibrium adsorption of soy whey on each MIP, solid phase concentration of isoflavone was determined for the MIP with and without porogen.

MIP with porogen: To a 500 mL glass resin kettle (equipped with water-driven condenser, electric driven agitator with Teflon® paddle, $N_2$ sweep, and heating mantle) 400 mL water, with 2.4 g polyvinylpyrolidone was charged. This suspending medium was heated to >90° C. and agitation of 400 rpm was then achieved. A syringe pump (Harvard Apparatus Pump 44) was used to dropwise add a previously mixed reaction mixture of 0.04 g VAZO-52®, 1.78 g EB, 3.56 g ethanol, 0.82 g MAA, 0.99 g styrene, 18.2 g EGDMA, 18.71 g cyclohexanol, and 1.96 g dodecylalcohol to the resin kettle. Dropwise addition was done at 50 mL/hr, with the transfer line temperature set at 40° C. The experiment was halted 95 min after addition began, and the polymer beads were recovered via Buchner filtration.

MIP without porogen: To a 500 mL glass resin kettle (equipped with water-driven condenser, electric driven agitator with Teflon® paddle, $N_2$ sweep, and heating mantle) 400 mL water, with 2.4 g polyvinylpyrolidone was charged. This suspending medium was heated to >90° C. and agitation of 400 rpm was then achieved. A syringe pump (Harvard Apparatus Pump 44) was used to dropwise add a previously mixed reaction mixture of 0.16 g VAZO-52®, 1.78 g EB, 2.56 g ethanol, 0.82 g MAA, 0.99 g styrene, and 18.2 g EGDMA to the resin kettle. Dropwise addition was done at 25 mL/hr, with the transfer line insulated. The experiment was halted 100 min after addition began, and the polymer beads were recovered via Buchner filtration.

Comparative Batch Equilibrium Adsorption

Both polymers were washed via Soxhlet extraction. The polymer beads made with and without porogen were tested using the batch equilibrium adsorption method, as described in the General Methods. Table 4 shows a favorable (e.g., Langmuirian) isotherm for the MIP with porogen and a less favorable isotherm for the MIP without porogen, where the data was obtained by sampling the liquid-phase concentration to determine the mass of adsorbate adsorbed to the polymer. For most adsorptive applications, favorable isotherms are typically preferred due to their higher loading at low concentration.

TABLE 4

Adsorption Isotherm Data

| Liquid phase concentration (ppm) | Solid phase concentration in the presence of porogen (ppm) | Solid phase concentration in the absence of porogen (ppm) |
| --- | --- | --- |
| 1 | 0.8 | 0.1 |
| 5 | 3.5 | 0.35 |
| Max | 4.4 | 6 |

It is expected that the use of other porogens would give similar results to those observed here. In addition, variations in the quantity of porogen used would likely alter the magnitude of the observed effects.

The combined data in this example show that judicious selection of template molecule and/or porogen can yield significant increases in polymer surface area and adsorption performance. These increases can be tuned by altering the quantity or type of template molecule and porogen. For this example, a template concentration of 5 . 15% of the total mass of monomer(s) is preferred.

Example 8

Comparative Batch Equilibrium Adsorption of Soy Whey of High Surface Area EB-imprinted MIP and the Non-imprinted Control MIP Following the results of Example 7, where the inclusion of template molecules was discovered to increase the surface area characteristics of the MIP formed, a single MIP and its respective "non-imprinted control" polymer were isolated for comparative examination of the polymers' adsorption performance.

MIP polymer 3 was subjected to Soxhlet extraction with chloroform (full reflux, 4 hours) to remove the EB template from the MIP, as described above. The MIP and its "non-imprinted control" polymer were then tested in batch equilibrium adsorption mode with soy whey, as described in the General Methods. The results for isoflavone uptake are shown in Table 5 for soy whey, using the high surface area EB-imprinted MIP and the non-imprinted control.

TABLE 5

Loading and Km for various polymers in soy whey

| Polymer #3 | Maximum loading* (ppm) | Km* (ppm) |
| --- | --- | --- |
| High Surface Area EB-Imprinted MIP | 5.3 | 6 |
| Non-imprinted Control | 0.99 | 20 |

*Calculated according to aglycone basis

These results demonstrate that a MIP with 760% greater surface area than a non-imprinted control is able to bind isoflavones with 530% greater selectivity (as determined according to maximum loading). The non-imprinted control possessed significantly diminished adsorption performance due to the lack of template and decreased surface area. Similar results are expected for other templates used in this technique. These results are important because high surface area is advantageous for better mass transfer between solute and polymer, and a high loading minimizes the quantity of polymer required to adsorb a given amount of solute.

Example 9

Recycling of Template Molecule

Following initial experimentation which proved the viability of the droplet polymerization method for the purpose of selectively recovering isoflavones from soy whey (Examples 1–3), analysis was conducted to determine the feasibility of "recycling" template molecules following formation of MIPs, for reuse in a subsequent MIP preparation. This example describes such a technique, whereby the Soxhlet extracted product of Example 8 is used to purify estradiol benzoate (EB) for its reuse in creation of EB-imprinted MIPs.

In Example 8, the MIP polymer 3 was subjected to Soxhlet extraction with chloroform (full reflux, 4 hours) to remove the EB template from the MIP. The extracted product of this process is a chloroform/EB mixture, which is then withdrawn from the Soxhlet apparatus. The mixture is passed through a 100 micron filter to remove particulate matter. The filtrate is placed in a flask connected to a rotary evaporator, under conditions of 50° C. and vacuum pressure (0.2 atm absolute pressure), and the filtrate evaporated to dryness. To recover the EB dried onto the walls of the flask, approximately 10 ml of acetone are added to the flask, swirled until the EB is solubilized, and decanted into a 50 ml beaker. The contents of the beaker are evaporated to dryness in a vacuum oven set at 50° C. and under vacuum (0.2 atm absolute pressure). After 24 hours, the beaker is removed from the oven and contains only a white powder. This white powder is confirmed via HPLC to be EB at 99% purity. Following purity analysis, the EB is collected from the beaker and used as template in a subsequent droplet polymerization for formation of a EB imprinted MIP.

This example shows that template can be recovered for reuse in future molecular imprinting applications, thereby lowering cost of the template and increasing the utility of the invention. One skilled in the art will recognize numerous other separative techniques that can be chosen to effect a separation of the template.

Example 10

Molecular Imprinted Polymer Formation and Template Extraction in the Same Vessel Following initial experimentation which proved the viability of the droplet polymerization method for the purpose of selectively recovering isoflavones from soy whey (Examples 1–3), analysis was conducted to develop methods for increased process efficiencies. Specifically, the goal of the present example is to demonstrate the feasibility of extracting the template in the same vessel and within the same suspending medium in which polymerization occurred. This is in contrast to the extraction techniques used in Examples 1, 4, 5, 7, and 8, which recovered the polymer beads via Buchner filtration and then subsequently used Soxhlet extraction for template removal from the MIP.

To a 500 mL glass resin kettle (equipped with water-driven condenser, electric driven agitator with Teflon® paddle, $N_2$ sweep, and heating mantle) 400 mL 1,5-dimethyl-2-piperidone is charged. This suspending medium is heated to >90° C. and agitation of 300 rpm is then achieved. A syringe pump (Harvard Apparatus Pump 44) is used to dropwise add a previously mixed reaction mixture of 0.16 g VAZO-67, 1.96 g EB, and 20 g EGDMA to the resin kettle.

After polymerization is complete, the temperature of the vessel is elevated at 120° C. while agitation is set at 500 rpm to maintain good mass transfer. A sample of the suspending medium is withdrawn every hour and is tested via HPLC for EB (template) concentration. After approximately five hours, no change in template concentration is observed and the extraction is complete. The mass yield of template (mass of template extracted/mass of template used in polymerization) is about 90%.

This example illustrates that formation of the molecularly imprinted polymer can occur in the same vessel as that used for template extraction, without the cumbersome steps of transferring the polymer to another vessel. In this case, the suspending medium is 1,5-dimethyl-2-piperidone and thus the temperature of the suspending medium can readily be raised to 120° C. for template extraction. A person of ordinary skill in the art would recognize that increases in temperature used for template extraction would typically increase the diffusion coefficient for the template, thereby increasing the extractability of the template. In addition, increases in temperature also commonly have the effect of increasing the ability of the suspending medium to solubilize template. Therefore, based on the boiling point of the suspending medium and the thermal lability of the template molecule, one can select a temperature appropriate for template extraction.

This technique of template extraction within the same vessel and with the same suspending medium in which polymerization occurred works because the droplet polymerization method allows for rapid polymerization of the reaction mixture, and hence formation of the imprinted sites, before the template is able to diffuse out. After the imprinted sites are formed, then the template is extracted via the suspending medium. One skilled in the art will recognize that selection of suspending medium is dependent on the template molecule(s) being used, such that the suspending medium is readily able to solubilize the template(s).

What is claimed is:

1. A droplet polymerization process to form a molecularly imprinted polymer, comprising the steps of:
   a) providing a monomer-template reaction mixture in the absence of a suspending medium, the monomer-template reaction mixture comprising
      (i) at least one monomer; and
      (ii) at least one template molecule,
   wherein interactions are formed between the monomer and template molecule;
   b) releasing the monomer-template reaction mixture of step (a) as droplets into a liquid suspending medium, at least one of the monomer-template reaction mixture and the liquid suspending medium further comprising a polymerization initiator system, whereby polymerization of each droplet is at least substantially completed in the suspending medium; and
   c) recovering the molecularly imprinted polymer from the suspending medium.

2. The process of claim 1 wherein the monomer-template reaction mixture additionally comprises
   (i) at least one porogen molecule; and/or
   (ii) at least one solvent.

3. The process of claim 1 or 2, wherein prior to or during step a) the monomer-template reaction mixture partially polymerizes, the viscosity of the monomer-template reaction mixture increasing by at least 0.1 centipoise, but not to the gel point, relative to the initial viscosity of the monomer-template reaction mixture.

4. The process of claim 1 or 2, further comprising, before or after step (b), extracting the at least one template molecule from the molecularly imprinted polymer.

5. The process of claim 4, wherein the at least one template molecule and the at least one porogen molecule are extracted from the molecularly imprinted polymer particles by the suspending medium.

6. The process of claim 4, wherein the at least one template molecule has a solubility in the suspending medium of at least 0.5 weight percent at a temperature of the suspending medium during the process.

7. The process of claim 4, further comprising recovering and recycling the at least one extracted template molecule for reuse in a subsequent monomer-template reaction mixture.

8. The process of claim 1, wherein the at least one template molecule is selected from the group consisting of: flavones, alkyl- or hydroxyl-substituted flavones, isoflavones, alkyl- or hydroxyl-substituted isoflavones, amino acids, antibiotics, steroids, peptides, polypeptides, proteins, aromatic molecules, hydroxylated aliphatic molecules, and molecules that are structural analogs thereof.

9. The process of claim 8, wherein the at least one template molecule is selected from the group of flavones consisting of: estradiol benzoate, phenol, genistein, daidzein, glycitein, genistin, daidzin, glycitin, malonyl genistin, malonyl daidzin, malonyl glycitin, acetyl genistin, acetyl daidzin, acetyl glycitin, and molecules that are structural analogues thereof.

10. The process of claim 1, wherein the at least one template molecule comprises about 5–15% (mass basis) of the total mass of the at least one monomer plus the at least one template molecule.

11. The process of claim 1, wherein the at least one monomer is selected from the group consisting of crosslinking monomers and functional monomers.

12. The process of claim 11, wherein the at least one monomer is ethylene glycol dimethacrylate (EGDMA).

13. The process of claim 1, wherein the polymerization initiator system is selected from the group consisting of: a thermal free radical initiator, a UV free radical initiator, and a gamma radiation free radical initiator.

14. The process of claim 13, wherein the polymerization initiator system is a thermal free radical initiator.

15. The process of claim 14, wherein the temperature of the suspending medium is not less than 20° C. below the half-life temperature of the thermal free radical initiator, the half-life being one hour in a hydrocarbon medium.

16. The process of claim 2, wherein the porogen is about 1 to 50 volume percent of the combined volume of the at least one monomer.

17. The process of claim 2, wherein the porogen has a solubility parameter within 2δ of the forming molecularly imprinted polymer.

18. The process of claim 2, wherein the porogen has a solubility in water at 20° C. of more than 2 percent weight, relative to the total weight of the suspending medium and the porogen.

19. The process of claim 2, wherein the porogen is selected from the group consisting of tetrahydrofuran, acetonitrile, $CH_2Cl_2$, $CHCl_3$, N-methylpyrrolidone, toluene, ethyl acetate, 1,2-dichloroethane, methanol, alcohols, acetone, and ethyl acetate.

20. The process of claim 1, wherein droplets are formed by passing the monomer-template reaction mixture through an orifice, wherein the orifice and suspending medium are non-stationary relative to one another.

21. The process of claim 20, wherein the suspending medium is agitated mechanically from 1 to 1000 rpm or ultrasonically agitated.

22. The process of claim 1, wherein the suspending medium contains energy required for polymerization.

23. The process of claim 22, wherein the suspending medium is heated.

24. The process of claim 1, wherein the polymerization of step (a) occurs by free radical polymerization, by condensation polymerization, and/or via radiation within the wavelengths of about 150–350 nm.

25. The process of claim 1, wherein at least 75% of the molecularly imprinted polymer is spheroidal primary particles ranging in size from 1 μm to 1 mm in diameter.

26. The process of claim 1, wherein at least 70% of the molecularly imprinted polymer is spheroidal primary particles ranging in size from 10 to 400 μm in diameter.

27. The process of claim 1, wherein the spheroidal primary particles have a surface area greater than about 150 $m^2/g$ when measured by nitrogen porosimetry.

28. A droplet polymerization process to form a molecularly imprinted polymer, comprising the steps of:

releasing a monomer-template reaction mixture, comprising:
  i. at least one monomer selected from the group consisting of functional monomers and crosslinking monomers;
  ii. at least one template selected from the group consisting of estradiol benzoate, phenol, genistein, daidzein, glycitein, genistin, daidzin, glycitin, malonyl genistin, malonyl daidzin, malonyl glycitin, acetyl genistin, acetyl daidzin, and acetyl glycitin;
  as droplets from an orifice into a liquid suspending medium, wherein at least one of the monomer-template reaction mixture and the liquid suspending medium further comprises a polymerization initiator system, whereby polymerization of the droplets is at least substantially completed in the suspending medium; and b. recovering the moleculariy imprinted polymer from the suspending medium; and c. extracting the template from the molecularly imprinted polymer before or after step (b).

29. The process of claim 28, wherein the monomer-template reaction mixture further comprises
  iii. at least one porogen selected from the group consisting of tetrahydrofuran, acetonitnle, $CH_2Cl_2$, $CHCl_3$, N-methylpyrrolidone, toluene, ethyl acetate, 1,2-dichloroethane, methanol, alcohols, acetone, and ethyl acetate; and/or
  iv. at least one solvent.

* * * * *